June 22, 1954  G. W. HOPKINS ET AL  2,681,766
ADDING MACHINE

Original Filed Nov. 7, 1949

FIG_1

INVENTORS.
GEORGE W. HOPKINS
DONALD L. ROLPH
BY

June 22, 1954

G. W. HOPKINS ET AL 2,681,766

ADDING MACHINE

Original Filed Nov. 7, 1949

INVENTORS.
GEORGE W. HOPKINS
DONALD L. ROLPH
BY

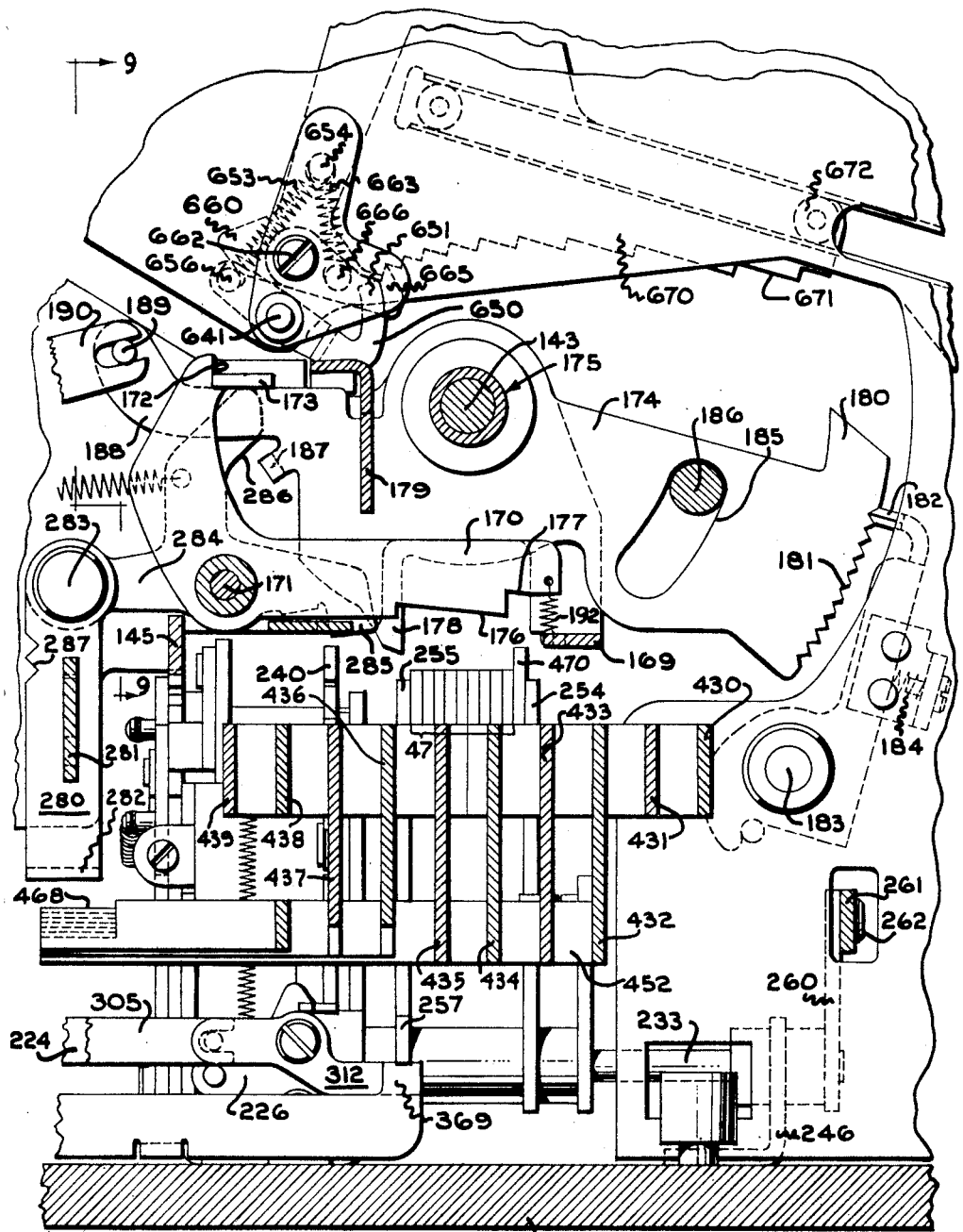

June 22, 1954
G. W. HOPKINS ET AL
2,681,766
ADDING MACHINE
Original Filed Nov. 7, 1949
13 Sheets-Sheet 5
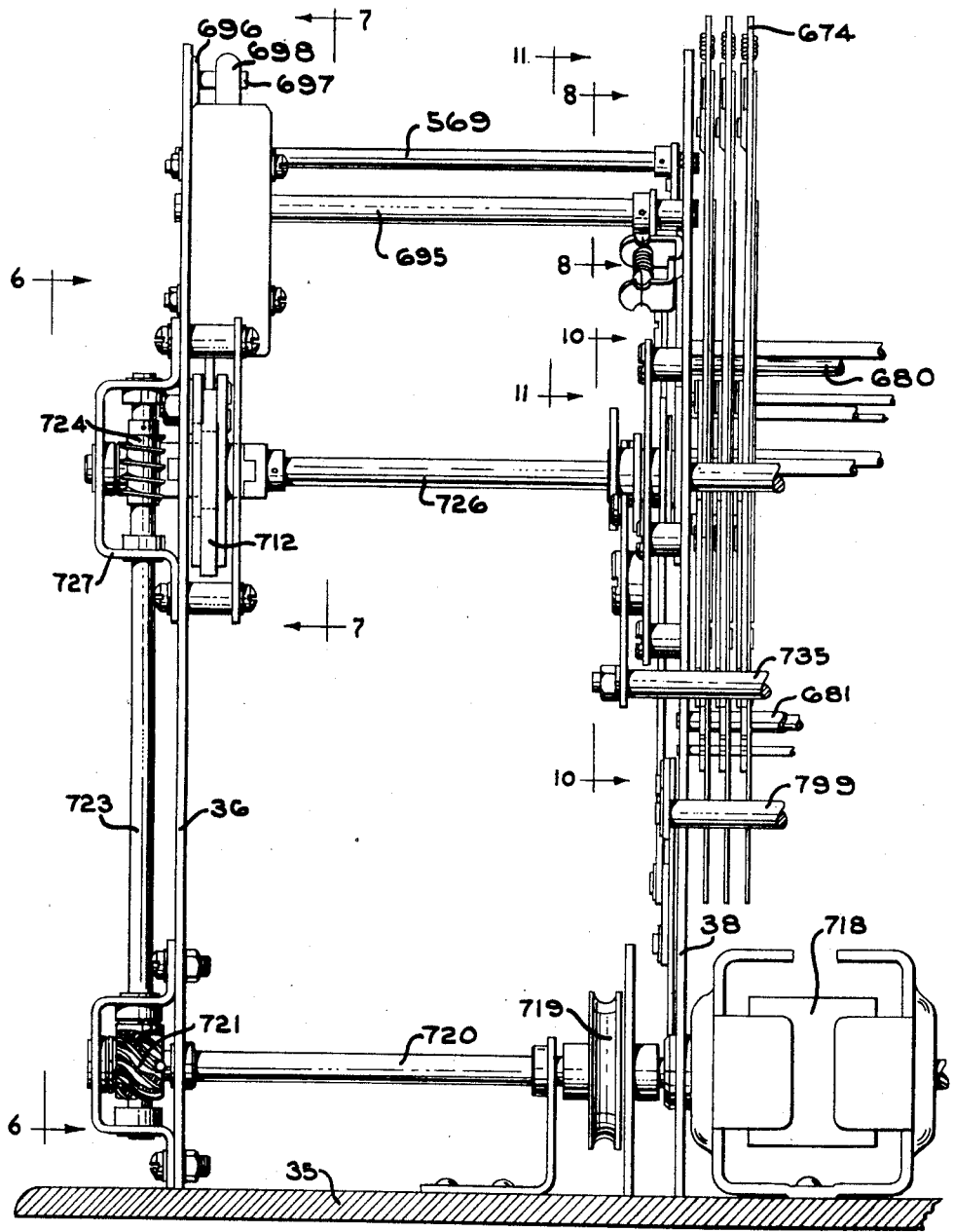
FIG_5
INVENTORS.
GEORGE W. HOPKINS
DONALD L. ROLPH
BY

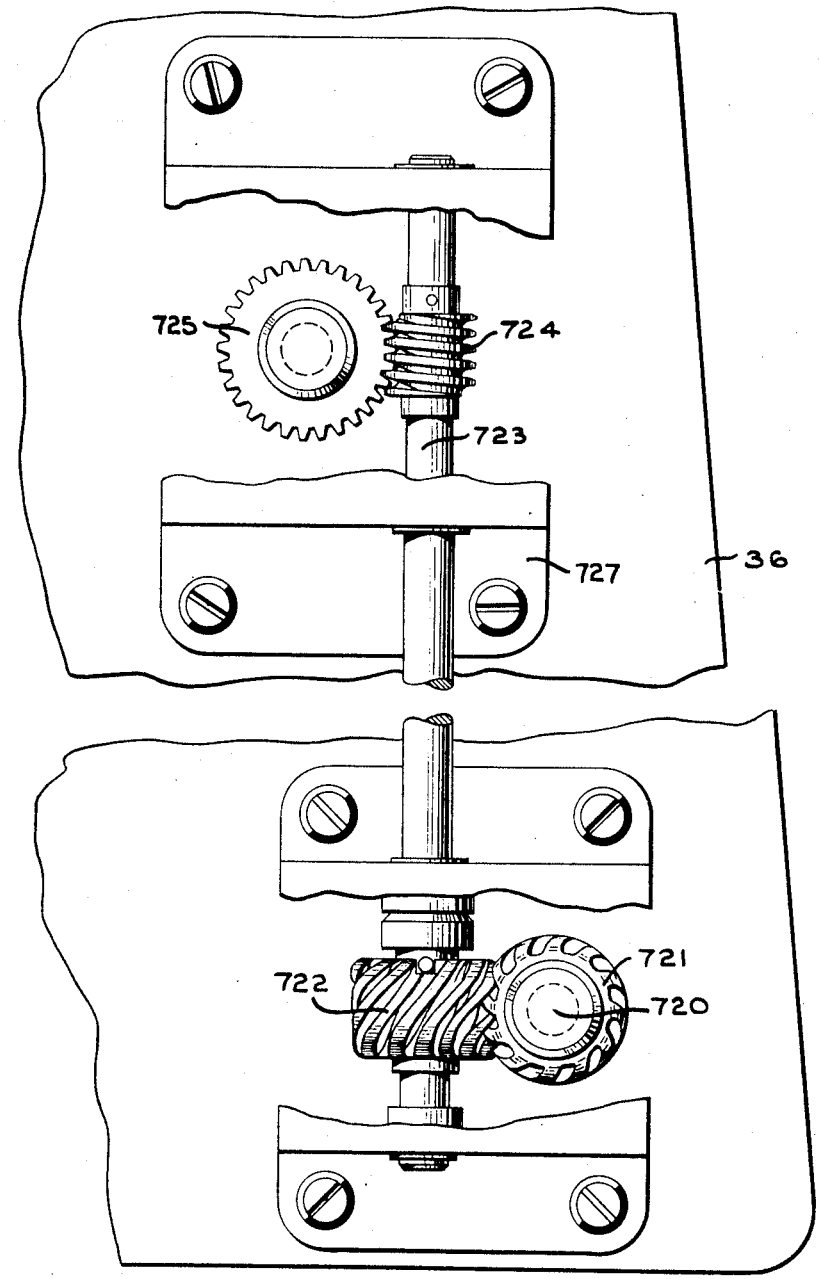

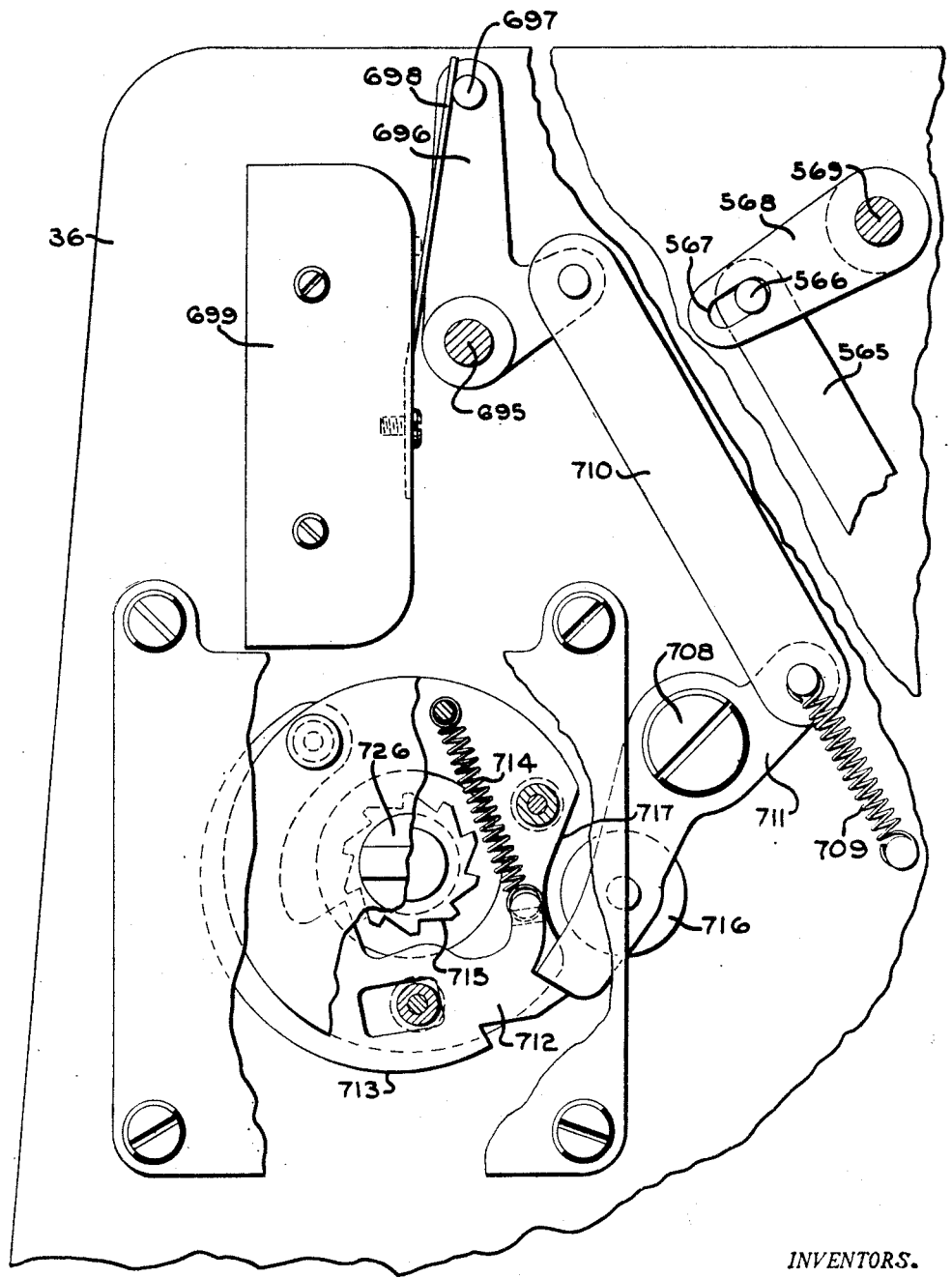

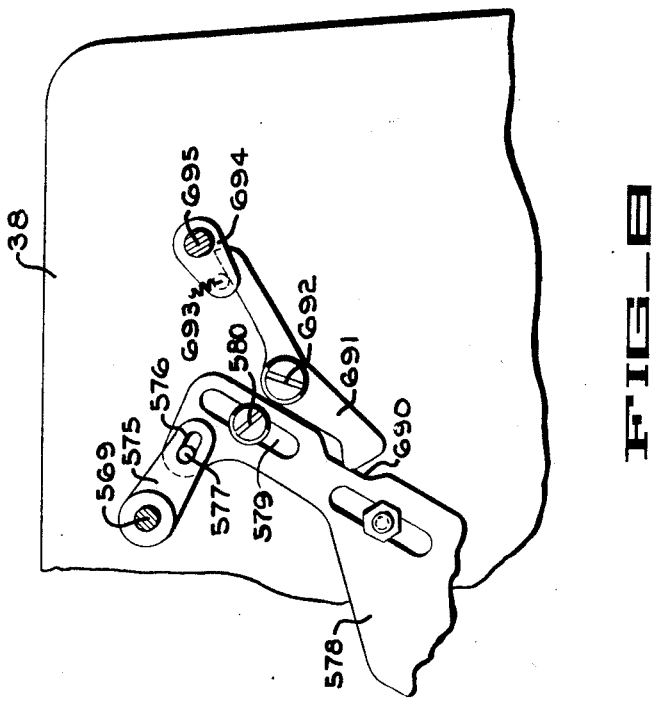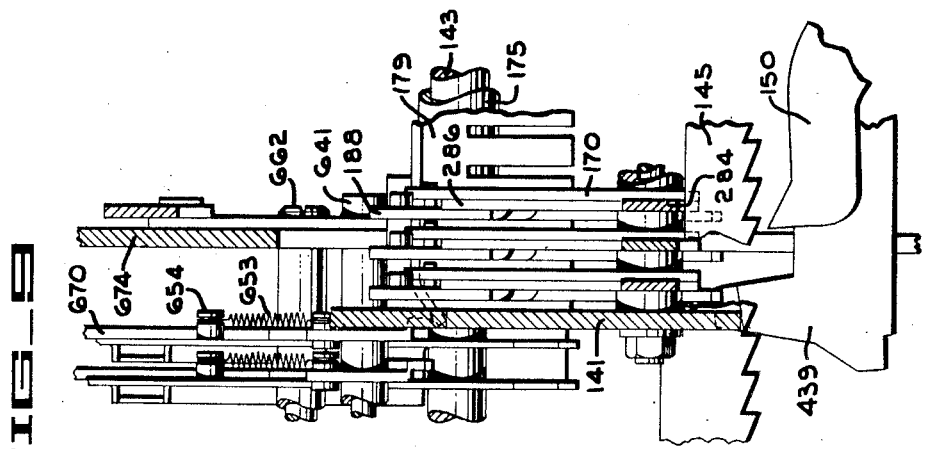

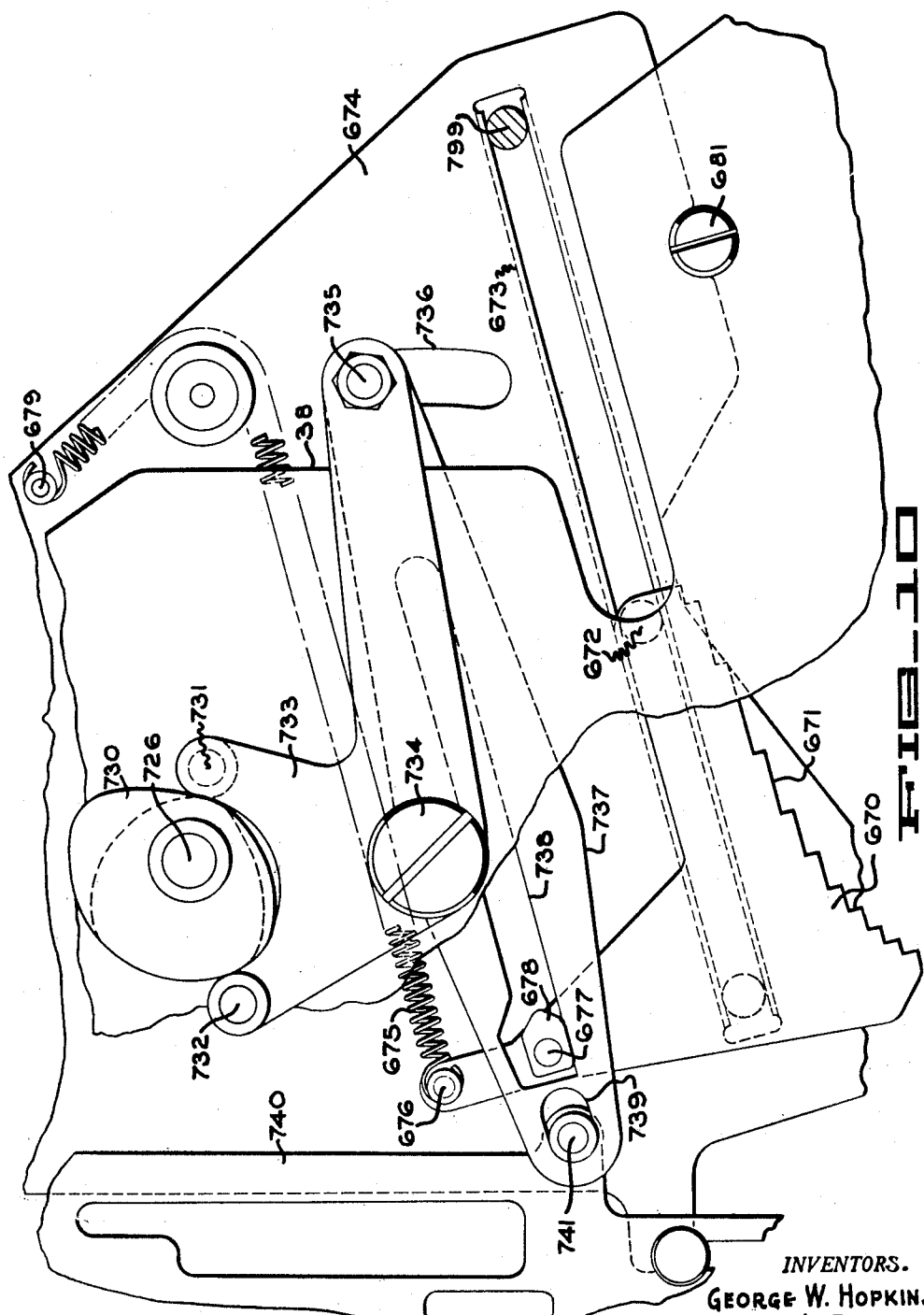

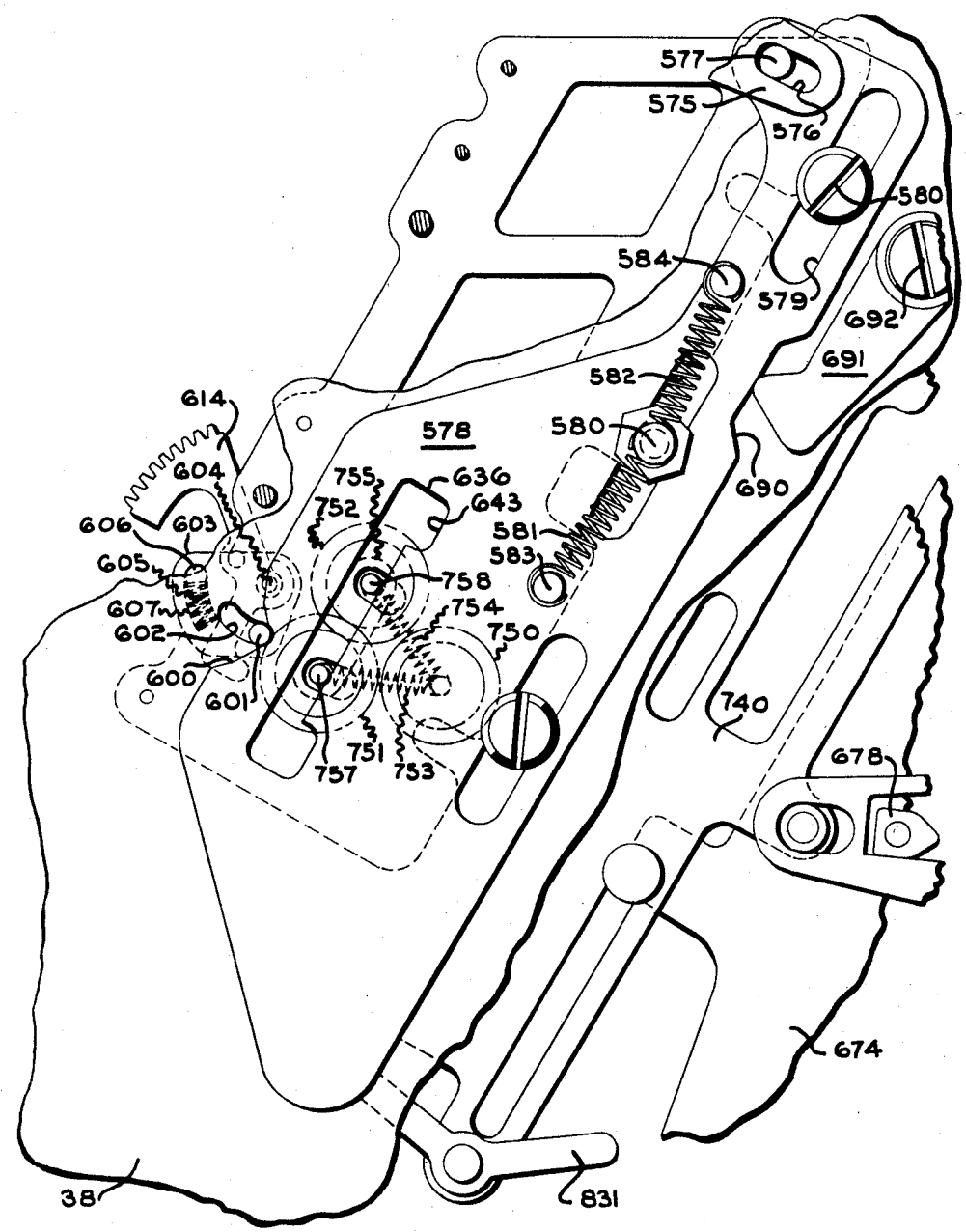
FIG_11

June 22, 1954  G. W. HOPKINS ET AL  2,681,766
ADDING MACHINE
Original Filed Nov. 7, 1949  13 Sheets-Sheet 11
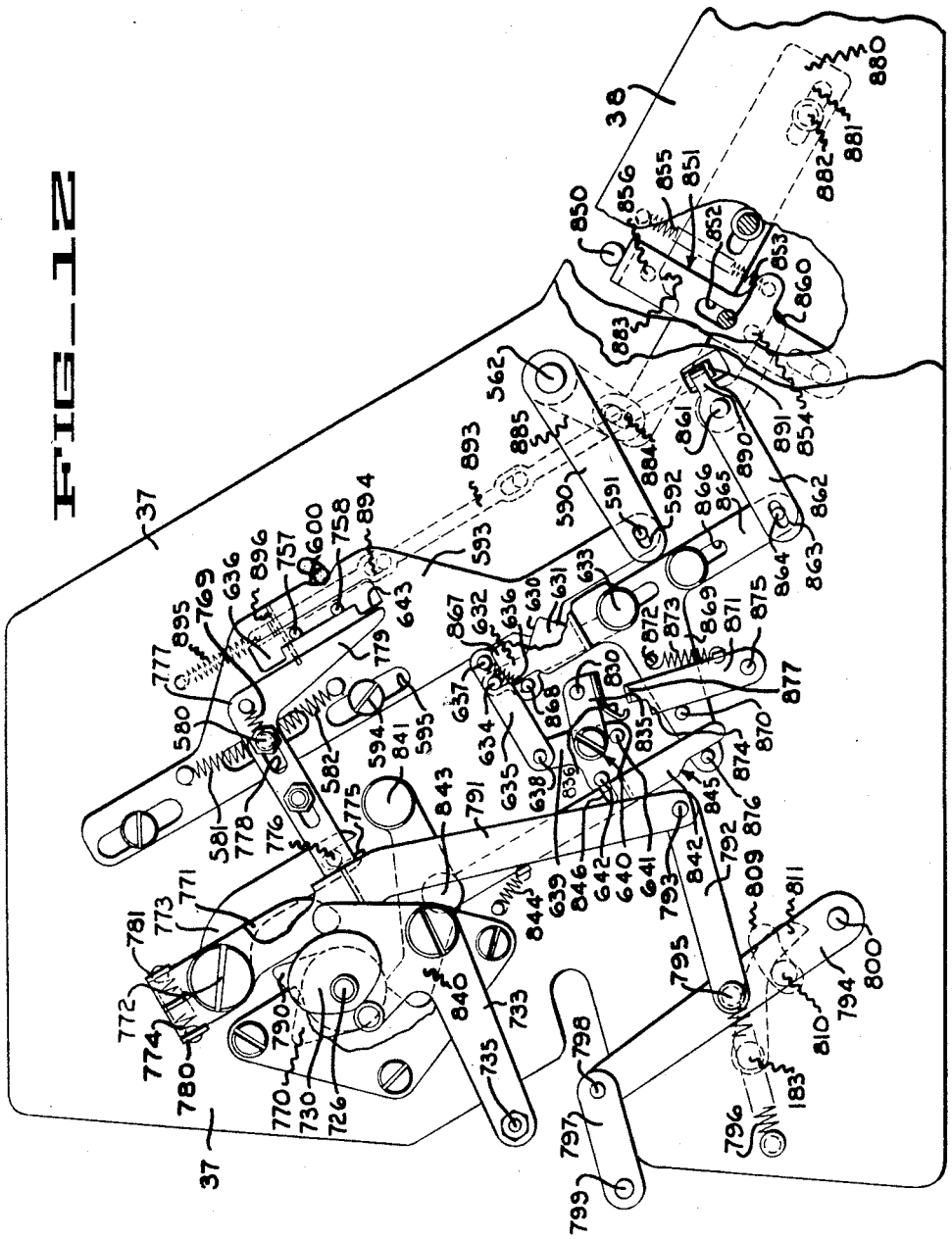
INVENTORS.
GEORGE W. HOPKINS
DONALD L. ROLPH
BY

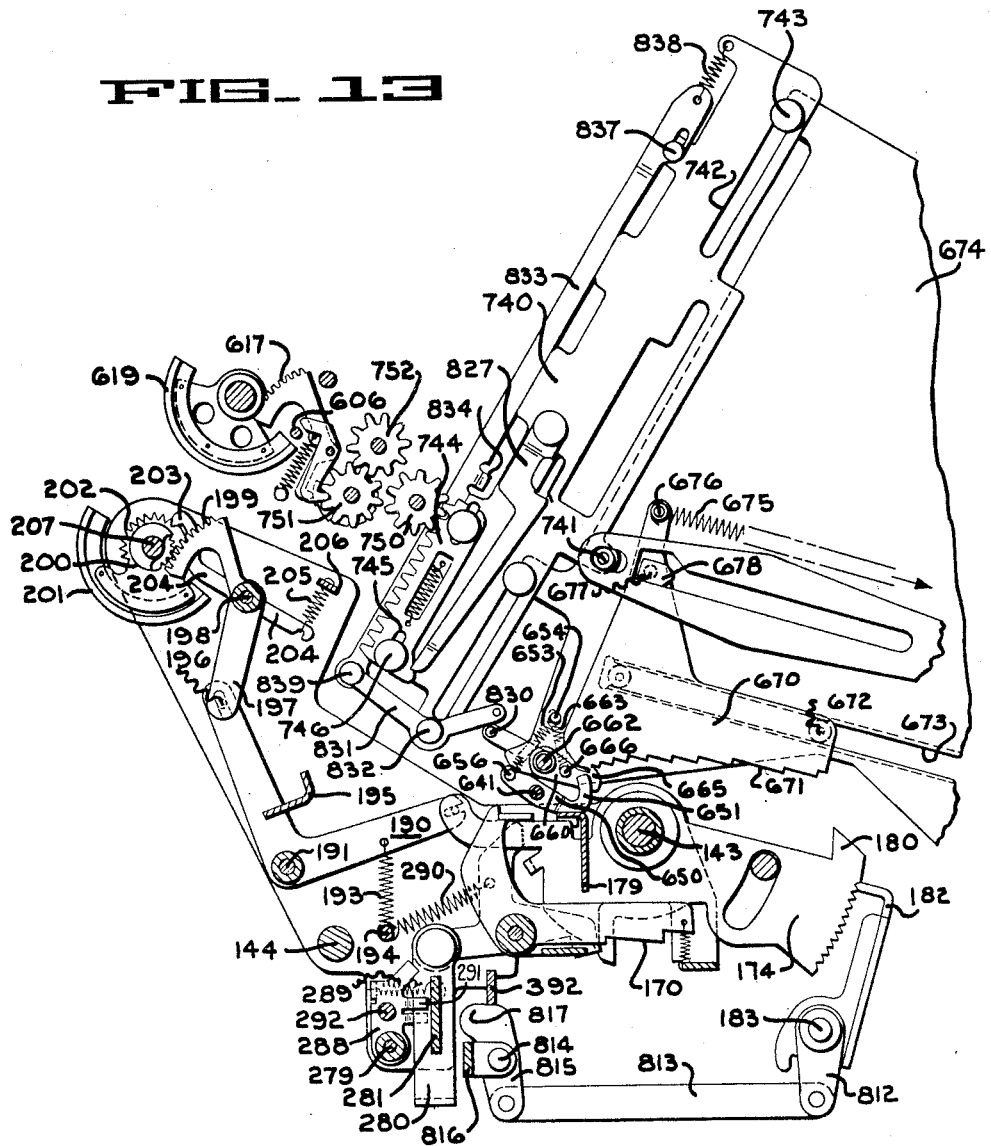

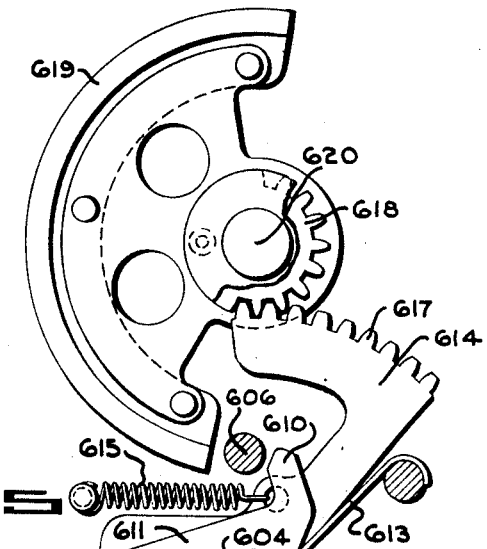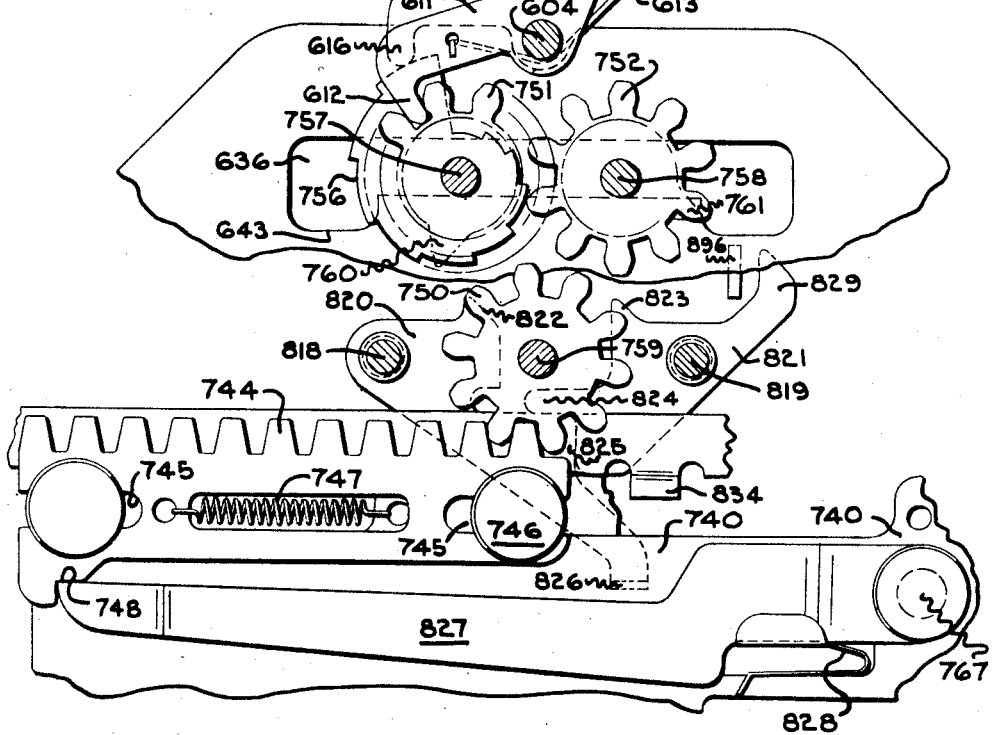

Patented June 22, 1954

2,681,766

UNITED STATES PATENT OFFICE 2,681,766

ADDING MACHINE

George W. Hopkins and Donald L. Rolph, San Leandro, Calif., assignors to Friden Calculating Machine Co., Inc., a corporation of California Original application November 7, 1949, Serial No. 125,872. Divided and this application January 31, 1950, Serial No. 141,507

9 Claims. (Cl. 235—79)

This invention relates to a registering mechanism for a ten key calculating machine and is a division of the co-pending application of the two applicants herein and Arthur J. Malavazos, filed November 7, 1949, Serial No. 125,872, which has been abandoned in favor of the continuation-in-part application S. N. 189,842, filed October 12, 1950, and is related to the co-pending application S. N. 141,508 of George W. Hopkins, one of the applicants herein, and Arthur J. Malavazos. The present application relates specifically to a digitation mechanism, preferably utilizing values placed in the internal carriage described in the two related applications. The related application of Hopkins and Malavazos just mentioned specifically describes and claims the selection mechanism for placing values in the internal carriage and the positioning of such carriage preparatory to digitation; while the parent application, although describing the complete machine and thus the features of each of the related parts thereof, formed by combination of the mechanisms of this and the related Hopkins and Malavazos applications, contains only claims directed to the entire machine, and particularly to the cooperation, or interaction of parts, of this and the related Hopkins and Malavazos applications.

The primary object of the present invention is to provide an improved digitation mechanism for a calculating machine.

Another important object of this invention is to provide a compact digitation mechanism for a small calculating machine, the mechanism occupying a relatively small space and capable of handling factors of considerable size. In one embodiment of this invention a machine of an overall width of about ten inches was capable of handling factors of twenty digits.

A still further object of the present invention is to provide a novel digitation, or value entering, mechanism for a calculating machine which is positive and fast in its action; which does not require a prolonged cycle to complete a carry; and which is readily adaptable for use with a plurality of totalizers, the factor entered on the single keyboard being selectively added to or subtracted from any one of such totalizers.

Another object of the present invention is to provide a new and improved method of tens-carry which is operative during digitation without the possibility of losing a number in the carry.

Another object of the present invention is to provide a simplified register in which the dials, preferably of crescent shape, can be placed in lateral juxtaposition to one another. In this form totals are accumulated in interior gearing of the machine during digitation, and are then sensed by a sensing mechanism which actuates the register dials.

These and other objects of the present invention will be disclosed in the specification and claims which follow:

Throughout the specification the "front" of the machine is that part closest to the operator during normal operation thereof; the "back" or "rear" is that part furthest from the operator; and the "right" or "left" the sides to the operator's right or left, respectively, as the operator faces the front of the machine. Obviously, in views from the rear (such as in Fig. 5) the right side will appear at the left of the figure. Also, "longitudinal" is used as indicative of something extending from front to back; and "transverse" as extending from left to right across the machine.

The present invention will be readily understood from a reference to the drawings. It can be here noted that the drawings herein are substantially exact duplicates of Figs. 1, 4, 9, 13, and 18 to 28, inclusive, of the above-mentioned continuation-in-part application Serial No. 189,842. Reference characters on these drawings which are not referred to in the present specification are the reference characters in such parent application and the parts so indicated are described in such parent application and also in the Hopkins and Malavazos application above-mentioned.

Fig. 4 is a cross-sectional view, from the right side, of the selection mechanism and the internal carriage, showing particularly the relationship between the carriage of the related application of Hopkins and Malavazos and the digitation mechanism herein claimed and described.

Fig. 5 is a rear elevation of the right hand side of the adding machine of the present invention showing the drive mechanism operative to cause digitation.

Fig. 6 is a right side view of the right hand supporting plate showing the drive mechanism mounted thereon such as taken on a plane indicated by the line 6—6 of Figs. 1 and 5.

Fig. 7 is a left side view of the upper portion of the right side plate showing the clutch and switch mechanism taken along the longitudinal vertical plane indicated by the line 7—7 of Fig. 5.

Fig. 8 is a right side view of a detail of the power control mechanism on the central supporting plate such as taken along the longitudinal vertical plane indicated by the line 8—8 in Fig. 5.

Fig. 9 is a front view of a carirage detail being taken along the vertical plane indicated by the line 9—9 of Fig. 4.

Fig. 10 is a right side view of a detail of the registration actuator mechanism mounted on the central supporting plate such as taken along the longitudinal plane indicated by the vertical line 10—10 of Fig. 5.

Fig. 11 is a right side view of the plus and minus slide mounted on the central supporting plate taken along the vertical longitudinal plane indicated by the line 11—11 of Fig. 5.

Fig. 12 is a left hand view of the left side supporting plate being taken along the longitudinal vertical plane indicated by the line 12—12 of Fig. 1.

Fig. 13 is a fragmentary right side elevation through the carriage and registering mechanism, taken on a vertical longitudinal plane through the machine immediately to the left of the central supporting plate.

Fig. 14 is a right side view of a detail of the registering mechanism.

Fig. 15 is a front view of the register dial.

GENERAL ARRANGEMENT

Figure 1:
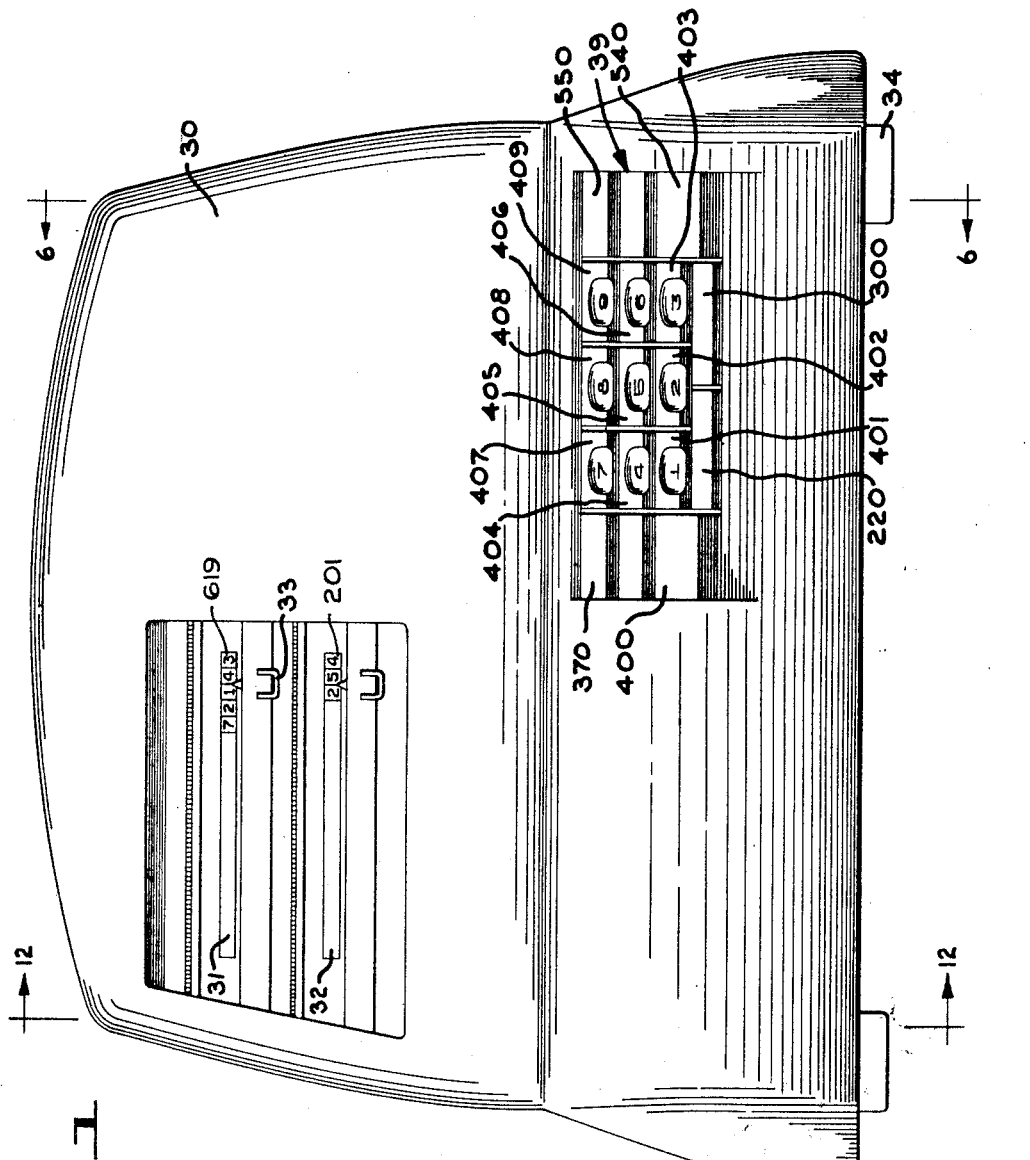
Fig. 1 is a front view of the adding machine of this invention.

The adding machine of the present invention is shown in Fig. 1. The machine is preferably enclosed in a customary cover plate 30. In the upper left hand corner of the cover plate is a suitable rectangular aperture 31 for the display of totals accumulated in the machine, or a plurality of such apertures if a plurality of registers is desired. Below the aperture 31 is a second aperture 32 for the display of the factor then being set up in the machine, i. e., for display of "check dials." Slidable decimal indicators 33 may be mounted adjacent the apertures for indicating decimal points in the check dials and register dials. Preferably the machine is mounted on a plurality of rubber feet 34.

The general arrangement of the mechanisms is as follows: The keyboard comprising the zero key 400 and the 9 numeral keys 401 to 409, inclusive, and the control keys are arranged in the lower right hand front face of the machine, as shown in Fig. 1. Preferably the value and control keys are mounted in a removable assembly, which is inserted through a suitable opening 39 in the lower right hand face of the cover plate.

The register dials 619 and aperture 31, and the check dial aperture 32 are located in the upper left hand corner of the face of the machine. The check dials 201 are carried by the internal carriage, hereinafter described, while the register dials are rotatably but non-shiftably mounted in the machine. The internal carriage lies transversely in the machine, and is located slightly below the level of the check dials, and in its home position is located to the right of the aperture 32, i. e., somewhat above the keyboard. In this position, no figures can be visible in the check dial aperture 32. The selection mechanism for transposing values selected by depression of the value keys into the internal carriage lies behind and below the keyboard. It will be understood that with the insertion of values into the internal carriage, it (the carriage) is shifted ordinally to the left, disclosing the values so inserted in the check dials, digit by digit, as they are entered.

The accumulating mechanism is located behind and below the aperture 31, and utilizes the values inserted into the carriage for adding to or subtracting from the values standing in the accumulator. In digitation, the accumulating mechanism for each order of the register is differentially operated according to the value standing in the carriage in the same order. In the example shown in Fig. 1, only the first three orders from the right will be operative to add or subtract the figure shown in the check dials, to the corresponding orders of the register. While all of the actuating levers (one for each order of the register) are driven during digitation, only the levers in the orders in which a digit is shown on the check dials are effective to cause direct operation in the register. Of course, there is a tens carry mechanism, which is operative to the left of the actuated accumulating mechanisms, and this carry mechanism is operative throughout the full width of the register.

Figure 3:
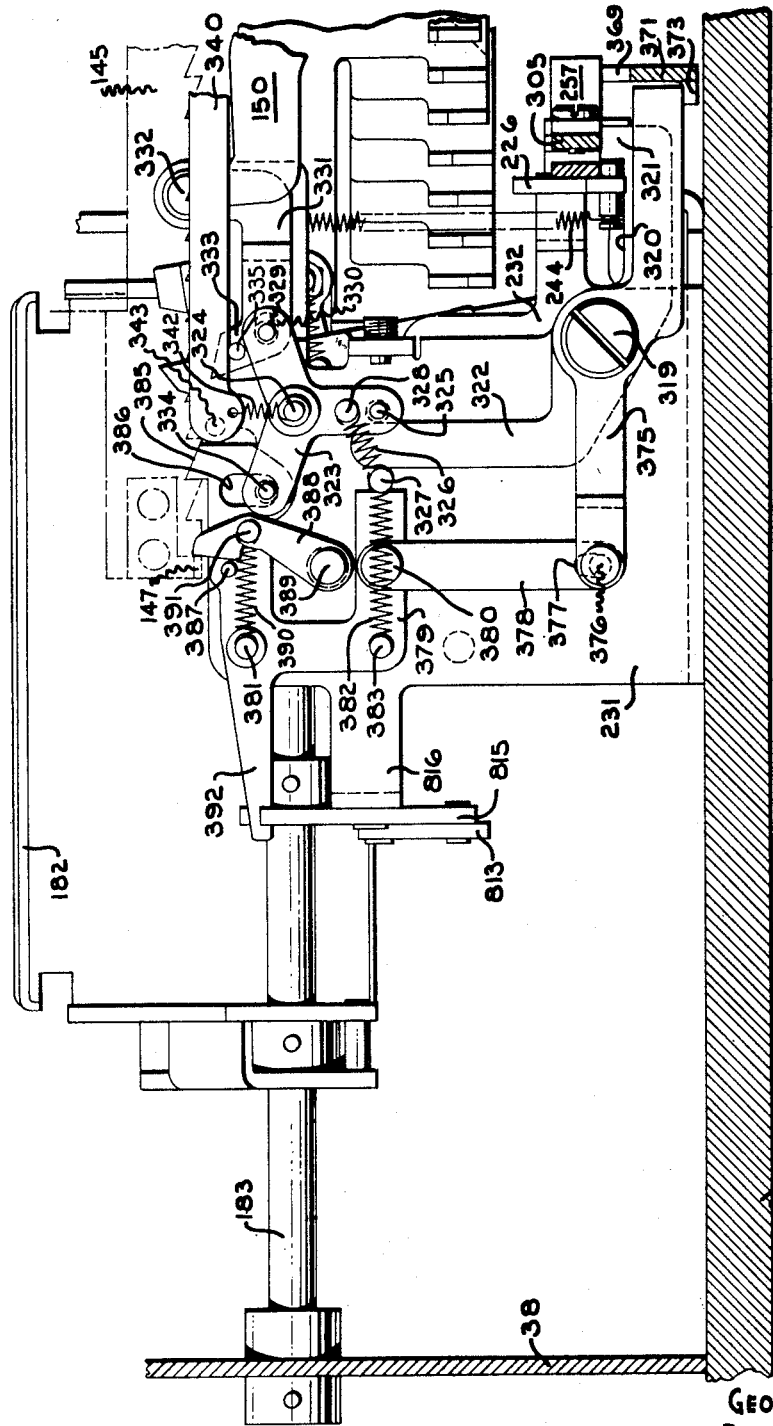
Fig. 3 is a front view of the carriage shifting mechanism taken at a transverse plane immediately behind and to the left of the keyboard.

The mechanism of the machine is mounted upon a base plate 35, which in turn is supported by the feet 34. Mounted on the base plate 35 are preferably three supporting plates, a right side plate 36 (Fig. 5), a left side plate 37 (Fig. 12) and a center supporting plate 38 (such as is shown in Fig. 3 or 5). Other mechanisms will be supported upon the brackets mounted upon the base plate or on the three major supporting plates as will be from time to time described.

VALUE SELECTION

The value selection, or the differential setting of the selection segments, is properly the invention of George W. Hopkins and Arthur J. Malavazos, as shown and described in their co-pending related application heretofore mentioned. For this reason the mechanism and its operation for the entry of such values into the settable segments of the carriage will not be described herein. It suffices, for purposes of understanding the present invention, to assume that the values to be entered into the machine are entered by means of the value keys 400 to 409, inclusive, for operation through proper mechanism to differentially position the rotatable segments 174 disclosed in detail in Fig. 4.

The mechanism for the entry of values can briefly be summarized as follows: For the present it is sufficient to note that the carriage slides on transverse bars 143 and 144 (Fig. 13) and is provided with a rack 145 which is adapted to be engaged by a carriage shifting pawl 150 (Fig. 3) to move the carriage to the left. The carriage is normally pulled to the right hand, or home, position by a strong spring 146.

As shown in Fig. 4, a sleeve 175 surrounds the supporting shaft 143. On this sleeve 175 is rotatably mounted a number of differentially settable selection segments 174, one for each order of the capacity of the machine. Associated with each segment 174 is a setting mechanism. As the selection segments and the cooperative mechanisms are identical, only one need be described in detail.

A shaft 171 extends transversely of the machine and lengthwise of the carriage, and is shown in cross-section in Fig. 4. On this shaft is mounted a number of bellcrank latches 170, one for each selection segment 174. The upper arm of each bellcrank 170 is provided with a latching notch 172 which normally engages an ear 173 on the selection segment. It will be noted that the lower edge of the bellcrank latch 170 is provided with a notch 176 adapted to be engaged by the noses of the selection arms 431—439. The edge of this notch is placed at an angle to the side of the bellcrank, as it is desired to have a uniform stroke of the latch 170 irrespective of the distance from the shaft 171 at which the latch is engaged. The nose 470 for the zero selection lever 430 stands above the others for the purpose described in said related applications, and so requires an additional, and deeper, notch 177 whereby when it engages the bellcrank 170 it will move the crank only a distance equal to that of the other arm. The latch 170 is pulled clockwise into latching position by a suitable tension spring 192 stretched between the end of the arm 170 and a common bracket 169 carried by the carriage.

The entry of a value into the selection arms, by causing their noses 47 to rise, disengages the latch 170 and permits the selection segment 174 to rotate counterclockwise under the influence of spring 193 (Fig. 13). The segment 174 is provided on its lower edge with a stop 178 which engages the upwardly latched nose of the selection arm and thereby stops rotation of the selection segment. The amount of rotation of segment 174 is inversely proportional to the value of the key depressed. In the form shown eleven values are possible: a blank, the 9 to 1, inclusive, and zero. In Fig. 4 the segment stands in the blank position, which is the position in which the selection segment is normally latched. The 9 value is next and represents the smallest amount of rotation of the selection segment. The value of zero is at the other extreme and represents extreme amount of rotation. For this reason the nose 470 of the zero selection arm 430 is sufficiently high to always stop the selection segment at the zero position, if no numeral key is latched in raised position (as will happen when a multiple zero is entered into the machine).

The selection segments are held in properly spaced relationship by a comb 179 which extends longitudinally of the carriage. The upper surface of the comb also serves as a camming face to lift the right hand end of hook members 650 for the purposes hereinafter described.

The upper right hand portion of the selection segment is provided with a nose 180 adapted to engage the respective differential notches 671 of the selection slide 670 to be described hereafter. The right hand edge of the selection segment is provided with a rack 181 of eleven teeth corresponding to the blank, the 9 to 1, and zero positions (reading from top to bottom). The selection segment is normally latched by the bellcrank 170 in the blank position, in which it is shown in Fig. 4. The carriage is moved one step to the left almost simultaneously with the setting of a value into the selection segment and as the selection segment has stopped at a differential position corresponding to the value entered, the notch 181 corresponding to such value will engage and slide upon the long detent 182 and thereafter be latched in that position. The detent 182 is pinned to a shaft 183 and is spring-pressed to engaged position by a suitable spring 184.

The selection segment is also provided with a forwardly extending arm 188 which carries a pin 189 engaging the bifurcated end of a bellcrank 190. The bellcrank 190, as shown in Fig. 13, is rotatably mounted on a shaft 191 extending across the carriage. The bellcrank is pulled clockwise by a relatively strong spring 193, one end of which is connected to the bellcrank and the other end of which to a bar 194 mounted in the carriage. A comb 195 holds the bellcranks 190 in proper operational relationship. The upper end of the bellcrank 190 has a suitable pin and slot connection 196 with a second bellcrank 197 rockably mounted on a shaft 198. The free end of the bellcrank 197 carries a gear segment 199 which engages a gear segment 200 mounted on the register check dial 201, which is rotatably mounted on shaft 207. Thus, the check dial registers the value set in the selection segment 174. The check dial 201 also carries a gear segment 202 which is engaged by the nose 203 of a pawl 204 pressed into engagement with the check dial by a spring 205 tensioned between the free end of the detent 204 and a spacing bar 206 extending across the carriage.

The values differentially set in the selection segments 174 can be cleared by operation of the clear bail 186, the operation of which will be described hereafter.

CARRIAGE SHIFTING

As each differential value is entered into the differentially positionable segments 174 of the carriage, the carriage is shifted one order to the left from its end position. This mechanism is shown in Fig. 3. The carriage is provided with a rack 145 with which is associated a stepping pawl 150. The pawl is given a leftward stroke with each operation of the value entering mechanism, as described in said related application, to move the carriage one space to the left. The carriage is held in its adjusted position by means of the holding pawl 385.

CLEARING

Provision is made for clearing the register 31 and for erasing the value set in the selection mechanism (which also erases the value set in the check dials 32) by depression of a single key 370 (Fig. 1). The depression of this key operates two separate mechanisms, one for erasing values set in the selection mechanism and the second for initiating an operation to clear values accumulated in the accumulating mechanism and shown in the register 31. The first will now be described, while clearing of the accumulator will be described later in connection with the operation of the accumulating mechanism.

The clear key and its associated stem are essentially the same as those of the value keys. Preferably, the key 370 is mounted above and behind the zero key 400. Depression of key 370 will rock a clear key lever 371 (Fig. 3) which is pivotally mounted on a transverse shaft, not shown herein. The forward end of the lever 371 carries a fixed stud 850 (Fig. 12) which depresses the key slide 851. This slide operates the mechanism for clearing the register and will be described hereafter in connection with operation of the digitation mechanism.

The operation of the clear key lever 371 to return the carriage to its home position and to erase the values from the selection segments 174 is shown and described in detail in the related applications. It is sufficient to note here that depression of the clear key, and the rocking of the clear key lever will rock an arm 257 (Fig. 3)

to release a detent (256 in the related applications) which normally locks the last operated selection arm in its raised or operative position. Rocking of the arm 257 and the releasing of the detent thereby will release the last operated selection arm, permitting it to return to its normal inoperative position. Thus, depression of the clear key will also, among other things, release any value in the selection arms.

Simultaneously with the release of the selection levers by operation of the detent not shown herein, the clearing mechanism operates to release the carriage rack 145 for return to its home, or blank, position by means of the spring 146. The mechanism for accomplishing this purpose is shown particularly in Fig. 3.

Adjacent the forward wall 231 of the bracket 229 (Fig. 3) the clear arm 371 is provided with a horizontal ear 373 which underlies a two-armed lever 375 rockably mounted on the bracket 231, as by pin 319.

A pin 376 on the left end, as viewed in Fig. 3, of the lever 375 engages a slot 377 in vertical link 378. The link 378 is pivotally secured to an h-shaped member 379 by means of pin 380. The h-shaped member 379 is rotatably mounted on the bracket 229 by means of pin 381. A spring 382, stretched between a pin 383 on the h-shaped member and stop pin 327 mounted on the bracket, pulls the h-shaped member counter-clockwise. Thus, the holding pawl 385 formed on the upper arm of the h-shaped member normally engages the rack 145 of the carriage. However, depression of the clear key rocks the clear key lever 371 to depress the forward end and raise the rearward end thereof. Raising the rearward end of the clear key lever 371 rocks the lever 375 counter-clockwise, which pulls the h-shaped member 379 clockwise to disengage the pawl 385 from the rack, thereby permitting the carriage to be pulled to the right to its home position by a spring, not shown herein.

Provision is made for latching the h-shaped member in disengaging position so that the clear key may be released immediately without terminating operation of the carriage clear mechanism. This is accomplished by means of a latch 388 which is rockably affixed to the bracket 231, such as by means of pin 389. The nose of the latch 388 is adapted to engage a pin 387 mounted on the upper arm of the h-shaped lever, when the h-shaped lever is rocked clockwise by depression of the clear key. The latch is pulled counter-clockwise by means of spring 390 tensioned between a pin 391 on the latch and the pivot pin 381. Thus, the h-shaped member is latched in disengaging position and the carriage can be returned to its home position by the spring even though the clear key is released.

The rack 145 is provided with an ear 147 which engages the latch 388 one space before reaching the home position of the carriage, whereby movement of the carriage to the home position pushes the latch off of the pin 387. Thereupon the spring 382 rocks the h-shaped member counter-clockwise to re-engage the pawl 385 with the rack 145.

It is also, as part of the clearing operation, necessary to restore the selection segments 174 to their blank position. This is accomplished by operation of the clearing bail 186 (Fig. 4). The bail 186 is mounted on a rockable plate, not shown, rockably mounted on shaft 143 adjacent the right side of the machine, and does not shift with the carriage. The bail itself, as shown in said related application extends only over the home position of the carriage so that its operation will clear only those segments which lie to the right of the units order of the register. Such a bail is necessary in order to permit clearing of a single selection segment if that is desired.

The mechanism for initiating operation of the clearing bail 186 is shown in said related application.

Digitation

Digitation in the present machine is controlled by depression of a plus or a minus key to either add or subtract the figure set in the carriage by the selecting mechanism just described. Depression of either of these keys sets the various control mechanisms and initiates digitation, and then restores the racks and carriage to their original positions. Specifically, depression of either key sets the following controls:

(a) Engages either the plus or minus gears with the driving gear.

(b) Disengages the gear detents.

(c) Disengages all sensing arms from the step cams, thereby rotating all dials to blank position.

(d) Drops selection plate latches in those orders engaged by the carriage to enter the value set on the selection segments into the machine.

(e) Closes the main motor switch.

(f) Operates the clutch dog to engage the clutch and permit the driving motor to operate the digitation mechanism.

(g) The main motor then drives all of the actuating, or value entering, racks to positions determined by the selection mechanism in order to enter the values locked in the selection plates into the accumulator cams.

(h) During the same cycle of operation the motor operates the mechanism to disengage the gears, thereby allowing the control slides to return to their neutral position. The return of the control slide to neutral position:

(1) Re-engages the detents with the gears, thereby locking them in adjusted position, (2) Re-enables the sensing mechanism to record the values accumulated in the accumulator cams on the register dials, (3) Conditions the selection plate latches for relatching them in operative position, (4) Conditions the clutch for disengagement in the full cycle position, and conditions the motor switch for opening at full cycle position.

(i) The main motor then actuates a restoring bail to return the selection plates to their home (latched) position, and (j) Simultaneously releases the carriage for return to its home position and consequent clearing of values contained therein. The same operation also restores all transfer racks to their proper position.

(k) Thereafter the drive mechanism completes its cycle, which opens the clutch, and opens the main motor switch.

Figure 2:
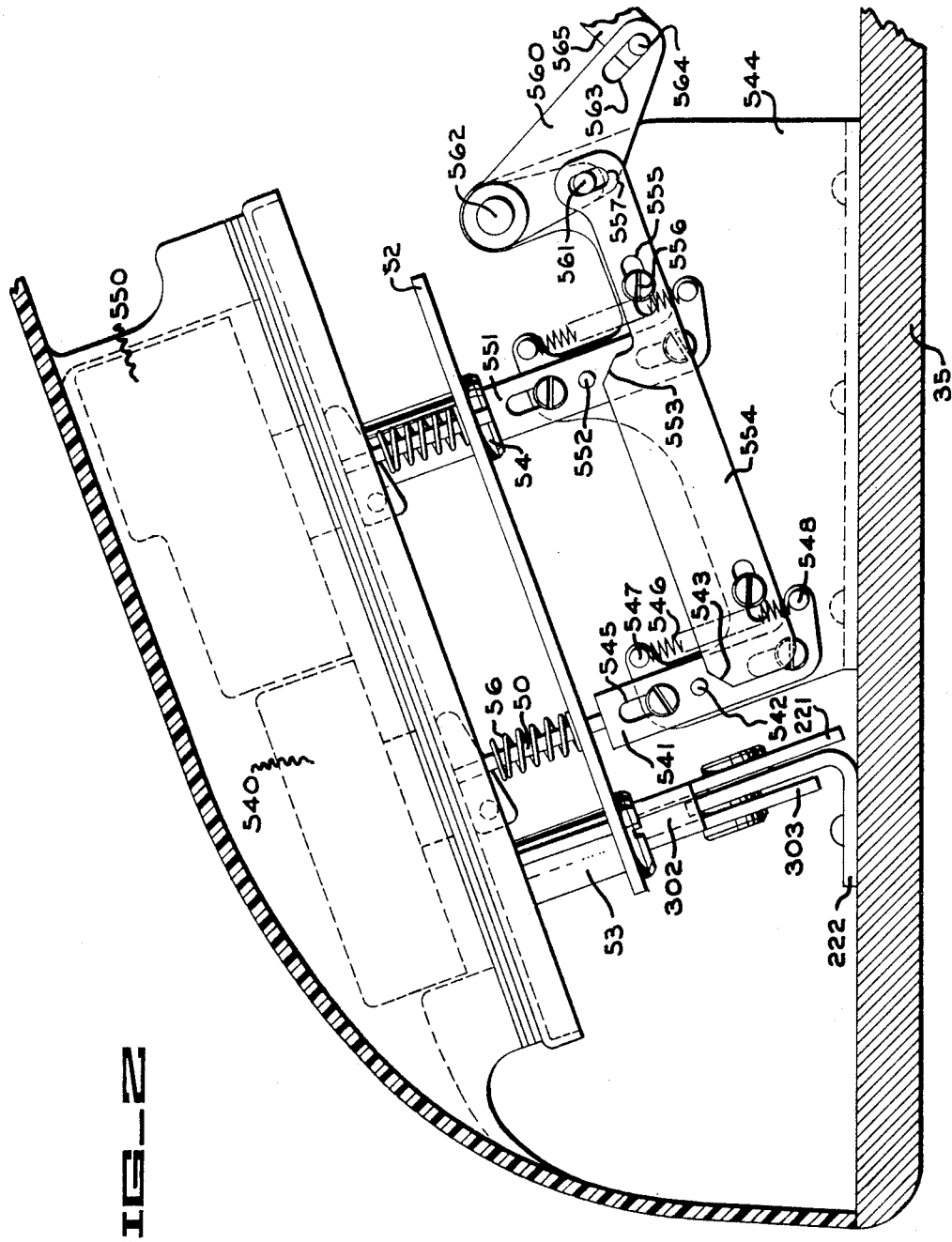
Fig. 2 is an enlarged detail of the plus and minus keys and their associated mechanism taken from the right hand side on a vertical longitudinal plane running through the right hand order of the keys.

The plus key 540 and the minus key 550 are shown in Fig. 1 as lying to the right of the keyboard. It is obvious the exact location is not critical as these keys can be placed in any convenient location. These keys are mounted upon key stems 59 (see Fig. 2). The keys are maintained in their elevated position by springs 56. A plus key slide 541 underlies the stem of the plus key 540, and is mounted for vertical sliding movement by any suitable means, such as pin and slot connections 545, upon a bracket 544 affixed to the base 35. The slide is maintained in its elevated position by means of a spring 546 tensioned between a pin 547 on an upstanding ear on the bracket and a pin 548 mounted on the toe of the slide. The slide carries a pin 542 adapted to engage the cam face 543 of the plus-minus slide 554 after a short movement of the key stem. The plus-minus slide 554 is mounted for substantially horizontal movement on the bracket 544 by any suitable means, such as slots 555 which encompass pins 556.

Similarly the minus key 550 is mounted on a similar key stem, which engages a minus slide 551 slidably mounted on the bracket 544. The minus slide 551 carries a pin 552 which is adapted to engage, after slight motion of the slide, the camming face 553 of plus-minus slide 554. It is obvious from the side view of the slide, shown in Fig. 2, that depression of the plus key 540 pushes the plus-minus slide 554 toward the rear while depression of the minus key pushes that slide toward the front of the machine.

The rearward end of the plus-minus slide is provided with a slot 557 which embraces a pin 561 on the plate 560. The plate 560 is pinned or otherwise rigidly secured to the transverse shaft 562. The plate 560 has a slot 563 which engages the pin 564 on the forward end of link 565. The other, or rearward end, of the link 565 (as is shown in Fig. 7) carries a pin 566 which is journalled in the slot 567 in the arm 568 pinned or otherwise rigidly secured to the shaft 569. The shaft 569 extends transversely from the right hand plate 36 to the center plate 38 (as shown in Fig. 5).

Adjacent the center plate 38, as is shown in Fig. 8, the shaft 569 carries an arm 575 pinned or otherwise rigidly mounted thereon. The free end of the arm 575 provides a slot 576, embracing the pin 577 on the plus minus slide 578 which is slidably mounted on the center supporting plate 38. The mounting just mentioned is shown more in detail in Fig. 11 and comprises a plurality of slots 579 which encompass screws or studs 580 attached to the central supporting plate 38. The slide is normally held in its central, or inoperative, position by a pair of opposed springs 581 and 582 which are tensioned between the middle supporting stud 580 and studs 583 and 584, respectively, affixed to the slide 578.

The shaft 562, on which is mounted the rocking plate 560, extends transversely across the machine through the left hand supporting plate, as is shown in Fig. 12. An arm 590 is pinned to this end of the shaft 562, on the outside of the left supporting plate 37. This arm has a slot 592 which engages a pin 591 on the forward end of the left hand plus-minus slide 593. The second plus-minus slide 593 is also normally held in a central, or inoperative, position by a pair of opposed springs, as shown. This plate is also slidably supported on screws or studs 594 which cooperate with slots 595 in the slide.

The two plus-minus slides (578 mounted on the center supporting plate and 593 mounted on the left hand supporting plate) are, therefore, operated in unison by the slide 554. Both plus-minus slides are supported for longitudinal sliding movement on their supporting plates, and both are normally held by yieldable means in a central, inoperative position. Although these two slides derive their motion from different shafts and different arms, their component parts are so constructed and arranged that the two slides, which are quite similar in form and size are always in alignment and always move simultaneously at the same velocity.

(a) Plus or minus gear engagement

The two plus-minus slides 578 and 593 are provided with identical flat U-shaped apertures 636 having a downwardly turned notch 643 at each end, as shown. Supported in these apertures 636 are two parallel gear shafts 757 and 758 which are maintained in spaced relationship by links 755. Referring now to Fig. 14 it will be seen that rotatably mounted on the shafts 757 and 758 are the plus gears 751 and minus gears 752, respectively, which are always in engagement with each other. It will be understood that there is a plus gear 751 and a minus gear 752, as well as a drive gear 750, for each order of the register. In their normal position the shafts 757 and 758 are in the central or raised portion of the U-shaped aperture and are disengaged from the drive gear 750 loosely mounted on a suitable shaft 759. Thus, if the plus-minus slides 578 and 593 are moved rearwardly, the plus gear 751 will drop into engagement with the driving gear 750, as the shaft is permitted to drop into the lower depression 643 of the aperture. Conversely, if the slide is moved forwardly, the shaft 758 can drop into the upper depressions of the apertures, thereby engaging the minus gear 752 with the driving gear 750. By this means the plus or minus gearing is engaged with the driving gear upon the first motion of the plus or minus slides resulting from depression of either the plus or minus key. In this connection, it can be noted here that the dropping of either shaft 757 or 758 into the notches 643 locks the plus-minus slides 593 and 578 in an operative position. Thus digitation will continue to completion even though the operating control key 540 or 550 be released. The slides are automatically unlatched when the gears are positively disengaged, as hereafter explained.

(b) Gear detents

The plus and minus gearing, as shown in Fig. 14, is normally locked against rotation by means of a detent 611 mounted on the shaft 604. The detent 611 has a nose 612 adapted to engage the gear 751 and at the other end is provided with a nose 610 adapted to become engaged by movement of bail 606 as hereinafter described. The detent 611 is normally held in gear engaging position by the torsion spring 613.

(c) Value sensing (register)

A step cam 756 is rigidly secured to the plus gear 751. This cam has 10 steps corresponding to the values 9 to 1, and zero. This cam serves as the actual accumulator and values are accumulated thereon. The register serves merely as an indicator which senses and displays the values so accumulated on the step cam 756.

The register dials 619, as shown in Fig. 14, are preferably of crescent, or arcuate, shape displaying the values zero to nine. The dials are loosely mounted on a common shaft 620. A gear segment 618 is rigidly secured to each dial. The dials are positioned by a sensing member 614 pivotally mounted on the shaft 604. The sensing member comprises a rocker arm having a nose 616 engaging the step cam 756 and at the other end a gear segment 617 engaging the gear segment 618. The sensing member is normally pulled counter-clockwise by a tension spring 615 as shown.

Referring now to Figs. 11 and 12 it will be seen that the plus-minus slides 578 and 593 have similar camming depressions 600 on their upper edges. Associated with each of these depressions is a pin 601 mounted on rockable plates 603 (one associated with each slide). These plates are rotatably mounted on the shaft 604 on the side of the supporting plate opposite that of the associated slide, the pin extending through a slot 602 in the supporting plate. Each of the rockable plates 603 has an arcuate slot 607 in which is mounted the opposite ends of a common bail 606 extending across the register mechanism. The bail 606 is yieldably held in the slots 607 by a suitable compression spring 605, as shown in Fig. 11.

Thus, the second effect of movement of the plus-minus slides 578 and 593 is to rock the rockable plate 603 clockwise (as shown in Fig. 11) to rock the bail 606 to first engage the detent 611 and disengage it from the gear 751 and immediately thereafter to rock the sensing member 614 to return the register dial to the zero position.

(d) Release of selection plates

Movement of the plus-minus slide 593 simultaneously releases the selection plates 670 (Figs. 4, 10 and 13) of those orders in which values have been set, thereby setting the mechanism for the differential actuation of the respective plus gears 751. The mechanism by which this is accomplished is shown in Fig. 12. The lower edge of the plus-minus plate 593 is provided with a camming depression 630 in which sets the nose 631 of a selection plate latch disengaging arm 632. This arm is pivotally mounted on a stud 633 riveted or otherwise affixed to the left side supporting plate 37. The free, or upper, end of the arm is provided with a pin 634 which engages a slot in the link 635. The link 635 is pivotally mounted on a pin 638 carried by the selection plate latch bellcrank 639. The link 635 is pulled clockwise by a spring 636 tensioned between a pin 637 on the upper end of the link and a pin 868 carried by the lever 632. The bellcrank 639 is pivotally mounted on the supporting plate 37, as by screw 640, and carries a bail 641 (which is also shown in Figs. 4 and 13). The sides of the depression 630 are sufficiently long to cam the selector plate latch disengaging arm counter-clockwise and hold it in that position so long as the plus-minus slide is held in an operative position. It is obvious that counter-clockwise rotation of the arm 632 also causes counter-clockwise rotation of the bellcrank 639 and rocking of the bail 641.

Each selection plate 670, of which there is one for each order of the register, is supported by a pair of rollers 672 engaging the race way 673 in the adjacent separator plates 674 (see Fig. 10). It can be noted that the various orders of the accumulator are separated by a plurality of separator plates 674 rigidly mounted in the accumulator section of the machine by any suitable means such as spacing bars 680 and 681 (see Fig. 5). The lower edge of the selection plates 670 is provided with a plurality of steps 671 which are adapted to be engaged by the nose 180 of the subjacent selection segment 174. The selection plate 670 is formed with an upstanding arm on which is mounted a stud 676. A strong tension spring 675 has one end secured to the stud 676 and the other to a pin 679 mounted on the separator plate 674. Thus, the plate is always under spring tension to the right, and unless latched in a leftward position will move to the right to a position determined by the nose 180 of the selection segment.

The selection plate 670 also carries a fulcrum 678 pivotally mounted thereon, as by pin 677. Movement of the selection plate 670 positions the fulcrum member 678 in a slot 738 of actuator lever member 737 for the purposes hereinafter mentioned. Such position is of course determined by the engagement of one of the steps 671 with the nose 180 of the subjacent selection segment 174.

The selection plates 670 are normally held in their leftmost position by a latching member 660 pivotally mounted on the cross shaft 662 (see Figs. 4 and 13). The latch is pulled in a counter-clockwise direction about its pivot point by spring 663 tensioned between a pin 666 on the latch and a pin 654 mounted on the supporting plate. Thus the nose 665 of the latch 660 normally latches on the leftmost step of the selection plate 670 and holds it in its leftmost position. The pin 666 is also adapted to be engaged by the disengaging arm 650 under certain conditions.

The disengaging arm 650 is pivotally mounted on bail 641. The disengaging arm is normally pulled in a clockwise direction by means of spring 653 tensioned between the pin 654 on the supporting plate and a pin 656 on the arm. The nose 651 of the arm is normally pulled by the spring 653 to a position below the pin 66 on the latch member. However, as the carriage moves to the left, its spacing comb 179 cams the superposed disengaging arms 650 upwardly, whereby the hook end 651 thereof engages the pin 666 on the latch. Thereafter, when the plus or minus key is depressed, the plus or minus slide 593 operates as hereinbefore described to rock the bail 641, which in turn pulls the disengaging arm 650 to the left (as shown in Figs. 4 and 13). Such motion of the latch member disengages the latch 660 from selection plate 670, permitting the plate to be spring-pulled to the right until one of the steps 671 thereon engages, and is stopped by, the nose 180 of the subjacent selection segment.

(e) Motor operation

The setting of the control mechanisms abovementioned occurs during the first part of the depression of a plus or minus key. The further depression of such key causes closing of the motor switch, thereby energizing the motor to operate the digitation mechanism. This mechanism is shown in Figs. 5, 7 and 8.

It will be recalled that depression of a plus or minus key causes a longitudinal translation of the plus-minus slides 578 and 593. The first portion of such translation is utilized to effect the setting of the control mechanism, as abovementioned. In addition to the other controls which it actuates, the slide 578, after a movement sufficient to set the various control mechanisms, initiates closing of the motor switch and the engagement of the clutch. The lower end of the slide 578 is provided with a relatively long depression 690 (Figs. 8 and 11), the sloping ends of which serve as camming faces to rock the two-armed lever 691. This lever is pivotally mounted on the center supporting plate 38, as by pin 692. Referring to Fig. 8, it is seen that the free end of the lever 691 engages a stud 693 on an arm 694 which is pinned to the shaft 695. The shaft 695 extends from the center supporting plate to the right supporting plate (as shown in Fig. 5).

Referring now to Fig. 7, it is seen that the right hand end of the shaft 695 carries a bellcrank 696 rigidly mounted thereon. The upper end of the bellcrank carries a stud 697 riveted thereto. The stud is adapted to engage the arm 698 of a suitable switch 699. Thus, longitudinal movement of the slide 578 rocks the bellcrank 696 counterclockwise to close the switch 699, and thereby energize the motor 718.

(f) Clutch engagement

The clutch 713 is engaged almost simultaneously with the energizing of the motor. The clutch engaging mechanism is also shown in Fig. 7. A link 710 is pivotally connected to the second arm of the bellcrank 696 and to the two-armed lever, or clutch pawl, 711. This lever is rockably mounted on the supporting plate by any suitable means, such as screw 708. The bellcrank 696 and the two-armed lever 711 are normally rocked clockwise by a tension spring 709, as shown. The free end of the lever 711 serves as a pawl to engage the clutch dog 712 of a clutch 713 of conventional construction. The clutch mechanism need not be described as such clutches are well known in the art. It can be noted however, that normally the spring 709 pulls the clutch pawl 711 into a position to block the dog 712, and thereby disengage the clutch. Whenever the bellcrank 696 is rocked against the tension of the spring 709 to close the switch to the motor, it also serves to disengage the clutch pawl from the clutch dog. Such disengagement permits the spring 714 to pull the clutch dog 712 into engagement with ratchet 715 mounted on the driving shaft, thereby engaging the clutch to drive the actuator shaft 726. Preferably the clutch is provided with means for positively maintaining the clutch engaged for a full cycle and then permitting disengagement at the end of the cycle. One such means is shown, i. e., a roller 716 mounted on the pawl 711 lies in a depression 717 in the periphery of the clutch plate. When the clutch is engaged the turning of the plate holds the pawl in disengaging position until the clutch returns to its full cycle position.

The motor drive is shown particularly in Figs. 5 and 6. The motor 718 is connected by means of a slip clutch 719, or other drive connection, to the horizontal shaft 720. The gear 721 mounted on the outer end of the shaft engages a gear 722 on the vertical shaft 723. The shaft 723 is suitably journalled in brackets 727, as shown. A worm 724 mounted on the shaft 723 engages a gear 725 which is keyed to the driving ratchet 715 of the clutch (see Fig. 6). A horizontal shaft 726 connects the driven side of the clutch 712 with the actuating mechanism to be described hereafter.

(g) Digitation

The drive shaft 726 extends transversely across the machine from the right to the left side plates. Adjacent the center and left side plates (Figs. 10 and 12, respectively) pairs of complementary cams 730 are pinned to the shaft. Each of these pairs of complementary cams is engaged by a pair of complementary cam follower rollers 731 and 732 mounted on a bellcrank 733. The bellcranks are pivotally mounted on their respective supporting plates, as by screws 734. The outer ends of the bellcranks support a common bail 735 which extends across the machine between the left hand and the center plates, the bail operating through arcuate slots 736 in the separating plates 674. It is obvious with each revolution of the shaft 726, the bail 735 will be rocked downwardly through a path of constant length and then rocked back to its starting position. The complementary cams are so designed to provide a dwell at the end of the down stroke in order to provide a period sufficiently long to disengage the register gearing before starting the return stroke. Thus, the down stroke can be utilized for the entry of values into the register, after which the gears are disengaged and the return stroke of the bail 735 has no effect upon the registering mechanism.

A plurality of slotted levers 737 (one for each order of the register) are pivotally mounted on the bail 735. A slot 738 of this lever engages the fulcrum 678 mounted on the associated selection plate 670. It will be recalled that the selection plates, when the latches 650 are released in the early part of the operation of the plus-minus slides, are pulled to the right by the springs 675 until the plates are stopped by the noses of the corresponding selection segments 174. Such movement of the plates 670 positions the fulcrums 678 in positions corresponding to the value to be entered. The adjustment of each fulcrum 678 causes a differential reciprocation of the free end of the associated lever 737 from the constant rocking of bail 735. This differential reciprocation is utilized to impart a differential rotation to the associated driving gear 750. To accomplish this purpose the free end of the lever 737 is provided with a slot 739 which engages a roller 741 on a slide 740. It will be understood that there is a slide for each order of the register.

It will be seen by referring to Fig. 13 that each slide 740 is mounted for longitudinal reciprocation on a separator plate 674 by means of slots 742 engaging pins 743 attached to the separator plate. Slidably mounted on each slide, is a rack 744. Only one such rack is shown in Fig. 13, but it is obvious that if a plurality of registers were desired it would be quite simple to mount a similar number of racks 744 on the slide 740, in which event each rack would be moved by the slide. The rack is mounted on a pair of broad headed pins 746 which are engaged by slots 745 in the rack (see also Fig. 14). These slots are relatively short, being only long enough to permit the rack to move one unit space relative to the slide. The racks are spring-urged to the right by means of a spring 747 tensioned between the rack 744 and the slide 740 as shown. The racks 744, however, are normally locked against movement relative to the slide 740 by means of a notch 748 engaging the tens carry detent, or latch, 827. As shown in Fig. 14, the gear 750 is constantly in engagement with the rack 744, so that differential reciprocation of the slide and rack imparts a differential oscillation to the gear 750 about its supporting shaft 759. It will be recalled that prior to energizing the motor 718, the plus gear 751 or the minus gear 752 are dropped into engagement with the driving gear 750. Thus, the down stroke of the bail 735 results in differential rotation of the gear 750 with the consequent entry by such rotation, additively or subtractively depending upon which gear is in engagement therewith, into the accumulator cam 756. While the slide and rack are returned to their normal position by the return stroke of the bail 735, with consequent counter-rotation of gear 850, such return does not affect the accumulator gears 751 or 752 as they will have been disengaged from gear 750 before such return stroke begins.

(h) Gear disengagement

It will be recalled that the complementary cams 730 are so constructed as to provide a dwell at the end of the down stroke of the bail 735. This dwell is utilized to permit disengagement of the plus-minus gears 751 and 752 from the driving gears 750, which permits the plus-minus slides to return to their neutral position. Such return of the plus-minus slides causes locking of the gears against rotation, sensing the new values on the accumulator cams and otherwise conditioning the control mechanism for a new cycle of operation. The mechanism for disengaging the accumulator gears is shown in Fig. 12.

A cam 770 is mounted on each end of the drive shaft 726, in the embodiment shown in Fig. 12, being adjacent the supporting plate and behind the complementary cams 730. Associated with each cam 770 is a cam follower arm 771 which is loosely journalled on the screw 772 mounted on the adjacent supporting plate 37 or 38. The cams 770 are so positioned on the shaft 722 that the nose of the cams engages the follower arm immediately following the beginning of the dwell on the complementary cams. Also pivotally mounted on the screw 772 is a second lever arm 773. The two arms 771 and 773 are connected by a spring 774 tensioned between their respective ears 780 and 781, so as to provide a yieldable connection for rocking arm 773 counterclockwise. The second lever 773 is provided with a bifurcated lower end 775 which engages a pin 776 on an L-shaped slide 777. The slide 777 is provided with a pair of slots 778 which engage supporting pins, such as 580. The perpendicular free end 779 of the L-shaped slide underlies the U-shaped slot 636 in which the two shafts 757 and 758 are journalled. Thus, rotation of the cam 770 and the consequent rocking of the follower arm 771 causes a forward translation of the L-shaped slide 777 to lift the shafts 757 or 758 out of the corresponding depression 643, thereby disengaging the plus-minus gear from the drive gear 750.

It was previously mentioned that the plus-minus slides are locked in their adjusted position by the shafts 757 or 758 dropping into the corresponding depression 643. Thus, the disengagement of the register gears by the raising of the shafts 757 or 758 automatically unlocks the plus-minus slides and permits them to be returned to their central, or neutral, position by means of the centralizing springs 581 and 582.

Return of the slide to its central, or neutral, position permits the pins 601 (Fig. 11) to drop into the camming depression 600 on the upper edge of the slides. thereby rocking bail 606 out of engagement with the gear detents 611 and the sensing arms 614. The detents and sensing arms are then returned by their respective springs to operative position. The detent, of course, will become seated between adjacent gear teeth to lock the accumulating gears against rotation. The sensing arm 614, however, can rotate counter-clockwise only until its nose 616 engages one of the steps of the accumulator cam 756, thus registering on the dial 619 the new value accumulated in the accumulator cam.

Similarly, the return of the plus-minus slide 593 to its neutral position permits the cam nose 631 (Fig. 12) of the lever 632 to become seated in the bottom of the depression 630, thereby returning the selection plate latch disengaging bail 641 to its neutral position. Return of the latch to its neutral position disengages the hooks 651 from the latching members 660 (Fig. 4) which are now spring-pulled counter-clockwise to a position to engage the selection plates 670 when they are restored to their normal position.

After the slight dwell, caused by the shape of the complementary cams 730, the bail 735 is rocked to its raised position (Fig. 10). This return of bail 735 returns the slotted lever 737 and the slide 740 to their neutral, or normal, position. Such return movement of the slide, however, has no effect on the register as the gears have been disengaged during the slight dwell.

(i) Selection plate return

Rotation of the drive shaft 726 also operates to reciprocate a plate restoring bail 799 (Figs. 10 and 12) to return the selection plates 670 to their normal position. The mechanism for accomplishing this reciprocation of the bail 799 is shown in Fig. 12. A second cam 790 is mounted adjacent each end of the drive shaft 726, in the drawings being shown as lying between the complementary cams 730 and the gear disengaging cams 770. Cam follower arms 791 are also swingably mounted on screw 772. A link 792 is pivotally mounted on the lower end of each bail restoring arm 791 by any suitable means, such as pin 793. Each link 792 is also rockably connected, as by pin 795, to a lever 794 which is pivoted to the supporting plate, as by pin 800. The upper or free end of each lever 794 is rotatably connected, as by pin 798, to a link 797—the bail 799 being carried by these links 797. A spring 796 tensioned between the pin 795 and the left side supporting plate pulls the levers 794 counter-clockwise to normally keep the bail 799 in its extreme disengaged position and to also pull the follower arms 791 clockwise to engage the cam 790. Thus the selection plates 670 are restored to normal immediately after the plus or minus gears 751 or 752 have been disengaged and the bail 641 has moved to allow latches 660 to return to their operative position.

(j) Automatic carriage return

It is not only necessary to restore the selection plates 670 to their normal position, it also is necessary to restore the carriage to its home position and thereby also operate the clearing mechanism heretofore described to restore the selection segments to their home position, and thereby erase any values set therein. This operation can be accomplished from the operation of the clearing bail 799. A preferred form of construction is to provide the lever 794 adjacent the center supporting plate with a roller 810 extending through an arcuate slot 809 in the center supporting plate 38. Movement of the lever 794 and its roller 809 operates to rock a lever 811 pinned to the left end of the shaft 183, on which is mounted the segment detent 182.

Referring now to Figs. 3 and 13, it will be seen that the shaft 183 is provided with a depending arm 812, which is pinned thereon adjacent the carriage releasing mechanism heretofore described. A link 813 connects the depending arm 812 to a bellcrank 815, which is rotatably mounted at 814 on a bracket 816. The upper portion of the bellcrank 815 is shaped as a cam 817 to engage and lift the tail 392 of the h-shaped member 379 to latch the holding pawl 385 in disengaging position. The carriage will be returned to its home position and the clearing solenoid will be operated as described in the related Hopkins and Malavazos application.

Before the drive shaft 726 completes its single cycle of operation, it also actuates mechanism to restore the tens-carry devices to their set position, as will be described in detail under the heading of "Tens carry."

(k) Termination of cycle

It has already been mentioned that the clutch is preferably of a form which positively locks itself against disengagement before the end of a cycle, as in the form shown in Fig. 7. The form shown comprises a depression 717 in the clutch plate 712 in which is seated the clutch pawl roller 716 when the clutch is in disengaged position. As the clutch plate rotates, the roller engages the periphery of the clutch plate, and thereby prevents disengagement of the clutch.

It will be seen by referring to Fig. 8 that when the plus-minus slide returns to its neutral position, the nose of the two-armed lever 691 will lie in the center portion of the depression 690. The lever 691 will, therefore, rock to a position in which the clutch can become disengaged and the motor de-energized. Such action is prevented by the roller on the clutch pawl holding the switch-engaging arm and the clutch pawl in their rotated positions. However, as soon as the clutch has completed a full cycle and returns to its full-cycle position, the roller 716 will again drop into the depression 717, thereby disengaging the clutch and opening the motor switch.

TENS CARRY

A simple and positive tens-carry (which is best shown in Fig. 14) is provided for the registration mechanism. A single tens-carry tooth 760 is rigidly affixed to each plus gear 751 and a similar carry tooth 761 is rigidly secured to each minus gear 752. The "plus" carry tooth 760, when the plus gear is in engagement with the drive gear 750, and when the cam 756 passes from the 9 to 0 position, engages the nose 822 of a carry lever 820 rockably mounted on the adjacent separator plate as by pin 818. Similarly, the "minus" carry tooth 761, when the minus gear is in engagement with the drive gear 750 and the accumulator cam 756 passes from 0 to 9 position, engages the nose 823 of a minus carry lever 821, also rockably mounted on the adjacent separator plate, as by pin 819. Preferably, the minus carry lever 821 is provided with a nose 824 which engages a projection 825 on the plus carry lever 820. Thus, when a negative-carry lever 821 is rocked( counter-clockwise in Fig. 14) it rocks the positive-carry lever clockwise. The nose and projection respectively, serve also as stops for the two carry levers.

The lower end of the plus-carry lever 820 is provided with an ear 826 which extends over to the next higher order, and is adapted to engage the tens-carry pawl 827 mounted on the slide 740 of such next higher order. The pawls 827 are rockably mounted on the slide 740, as by stud 767, and normally the nose of each pawl engages the depression 748 in the digitation rack 744. The pawl 827 is rocked clockwise to hold it in engagement with the depression 748 by any suitable means, such as spring 828. The slots 745 in the digitation rack 744 are of a length to permit the spring 747 to pull the rack one, and only one, additional tooth space when the pawl is disengaged from the rack. Thus, the tripping of the carry levers 820 or 821 by their respective carry teeth disengage the pawl 827 and permits the spring 747 to pull the rack one additional step (to the right in Fig. 14) to enter or subtract an additional digit as the case may be.

The means herein provided for the carry of tens is positive in its operation, and while the tens-carry operates during digitation it is impossible for the additional value to be lost.

The tens-carry mechanism is restored to its normal position by means of a bail 830 (Figs. 12 and 13) which is rocked during the operative stroke of bail 799 to restore the selection plates to their latched position.

Referring first to Fig. 13, it will be seen that the bail 830 engages the lower arm of a rocker 831, which is pivoted to the slide 740, as by pin 832. The upper end of the rocker is pinned to a tens-restoring slide 833, as by pin 839. The slide 833 is provided with an ear 834 adapted to engage the rack 744 and return it to its normal position. Upon such rocking, the pawl 827 again becomes seated in the depression 748 in the rack, thereby holding it in its normal position. The tens-restoring slide 833 is mounted on the slide 740 by suitable pin and slot connections 837, and is normally pulled upwardly by a tension spring 838.

The mechanism for rocking the bail 830 is shown in Fig. 12. The ends of the bail 830 are mounted in arms 835 which are pivoted on the screw 649. The arm 835 carries a strong spring member 836 which is formed to lie perpendicular to the plane of the arm. The spring 836 is engaged by cam follower arm 791 which rocks the plate restoring bail 799. Thus, oscillation of the follower arm 791 serves to simultaneously restore the selection plates to their normal position and to restore the carry mechanisms to their normal position.

REGISTER CLEARING

It will be recalled that depression of the clear key 370 operates to restore the carriage to its home position, which in turn causes operation of the restoring mechanism for operation of the bail 186 for restoring the selection segments 174 to normal position. Such operation erases values from the selection mechanism. It is also desirable to clear the values accumulated in the registering mechanism at the same time. The theory of the clearing operation is to run the values accumulated in the accumulator cam to zero by the automatic subtraction of the number then accumulated therein. The clearing key must, therefore, operate the mechanism which automatically sets a value in the selection plates corresponding to the values in the accumulator dials and then automatically subtracts the values so set. The mechanism utilized for this operation is shown in Fig. 12 and for the most part utilizes the value entering mechanism heretofore described. Prior to depression of the clear key it will be necessary to shift the carriage to the left so that the comb 179 carried thereby will cam the hooks 650 up into engagement with the pin 666 on latches 660, whereby the selection slide 670 can be released at the proper time in the clearing cycle. This shifting of the carriage can be done by use of the multiple zero key to shift the carriage the necessary spaces to the left.

It will be recalled that the clear key lever 371 (Figs. 3 and 12) carries an elongated pin 850 which engages the upper portion of a key slide 851 mounted on the center supporting plate (as shown in Fig. 12). The slide is provided with slots 852 which engage the studs 853 mounted on the supporting plate. A tension spring 855, one end of which is pinned to the supporting plate and the other to a projection on the slide, normally holds the key slide in a raised position. Immediately underlying a second stud 854 on the key slide is an arm 860 which is rigidly secured to transverse shaft 861 that extends to the left through the left side supporting plate 37. A two-armed lever 862 is mounted at the left end of the shaft 861. The lower arm of lever 862 is provided with a slot 863 engaging pin 864 on the clearing slide 865.

The clearing slide 865 is mounted for longitudinal movement by means of slots 866 engaging suitable pins such as 833. The upper end (left-hand end as viewed in Fig. 12) of the slide 865 terminates in an ear 867 lying adjacent the pin 637 on the link 635 which connects the selector plate latch disengaging arm 632 to the bellcrank 639. It is obvious, therefore, that depression of the clear key immediately causes translation of the slide 865 to the left, thereby rocking the link 635 counterclockwise a distance sufficient to disengage the pin 634 carried by the selector plate latch disengaging arm 632 from the slot in the link. Thus, the subsequent operation of the plus-minus slide, as hereinafter described, will fail to release the selector plate latches, the release of such latches being timed differently in the clearing of values from the register.

The slide 865 carries a perpendicular arm 869 on which is mounted a pin 870 engaged by the latch arm 871. The arm 871 is pivotally mounted on the supporting plate 37 by any suitable means such as pin 875. A spring 873 tensioned between the arm 871 and a pin 872 pulls the arm 871 in a counter-clockwise direction. The free end of the lever 871 is provided with a notch 874 which is adapted to latch under the pin 870 on the slide 865, thereby locking the slide 865 in operative position until the clearing operation is completed.

The outer end of the perpendicular arm 869 carries a pin 876 adapted to cooperate with the camming face 845 of the lever 842 which is pivotally mounted on cam follower 840 by any suitable means, such as pin 843. The cam follower 840 is pivotally mounted on the supporting plate by any suitable means such as stud 841. A spring 844 tensioned between an ear on the lever 842 and a pin on the side plate 37 normally pulls the lever 842 in a clockwise direction. However, the translation of the slide 865 causes the pin 876 to engage the camming face 845 of the lever to rotate the lever 842 counter-clockwise against the force of its spring 844. Such counter-clockwise rocking of the lever 842 causes a slot 846 formed therein to engage the pin 642 on the selector plate latch actuating bellcrank 639. Thus, the latch bail 641 is conditioned so as to be unaffected by movement of the plus-minus slide but to be actuated later in the cycle when the cam follower 840 is rocked by the cam 770.

The upper arm of the two-armed lever 862 forms an ear 890 which engages an ear 891 formed on a slide 893 extending upwardly and rearwardly. The slide 893 is mounted for longitudinal movement by suitable pin and slot connections 894, and is pulled to the rear and upwardly by a suitable tension spring 895. The rear end of the slide 893 engages a transverse comb 896 (also shown in Fig. 14). This comb 896 lies immediately in front of the arms 829 of each of the minus tens-carry levers 821. Thus, movement of the slide forwardly and downwardly conditions the comb 896 to block rocking of the minus lever 821 when the nose 823 of that lever is engaged by the single tooth 761 of the minus gear.

Associated with the key slide 851 is a slide 880 similar in construction to the slide 554 underlying the plus and minus keys. The slide 880 is mounted for longitudinal movement on the center supporting plate by means of slots 881 therein which embrace pins 882 on the supporting plate. The key slide 851 carries a pin 856 which is adapted to engage the camming face 883 of the slide 880 after a short travel of the key slide and subsequent to the rocking of the arm 860, shaft 861 and the movement of the slide 865. The cam face 883 is similar to the minus cam face 553 on the plus-minus slide 554. The slide 880 is connected by a suitable pin and slot connection 884 to an arm 885 which is likewise pinned on the plus-minus shaft 886. Thus, depression of the clear key, subsequent to the conditioning of the control mechanisms above mentioned, rotates the plus-minus shaft 861 to move the plus-minus slides in a negative direction and engage the digitation mechanisms in the same manner as if the minus key had been depressed. Such movement of the plus-minus slide, as heretofore described, will engage the minus gears 752 with the drive gear 750, release the gear detents, disengage the sensing arms and close the motor switch and engage the clutch. As previously mentioned, translation of the plus-minus slide cannot trip the selection plate latches at this time.

As the selection plates are maintained in their latched position, the down stroke of the common bail 735 will be ineffective to shift the actuator slides 740, as it will be recalled that the plates 670 are latched in their zero position. However, there is a prolonged dwell at the end of the downstroke of the common bail 735, caused by the shape of the cams. During this period of dwell, the cam 770 rocks the follower 840 to shift the link 842, thereby rocking the bellcrank 639 to operate the selector plate latch disengaging bail 641. The selector plates are, therefore, free to travel (to the right in Fig. 10) under the force of their respective springs 615. The travel of these plates, as the bail 735 is temporarily in its lowermost position, will move the fulcrum member 673 to raise the left end of the slotted levers 737. As the left end of the slide 737 is raised by the travel of the selection plate 670, the slides 740 are moved rearwardly carrying with them the racks 744 to rotate the driving gear 750 and the minus gear 752 until such time as the tens-carry tooth 761 on the minus gear engages the tens-carry lever 821. As the tens-carry lever is locked against rotation by the comb 896, rotation of the gears 752 and 750 is effectively stopped, thereby stopping the travel of the slide 740. It will be obvious that this upward movement of the slide 740 has erased the values from the accumulator cam 750 and stopped the gears in the zero position. Immediately thereafter, the cams 770 and 780 engage their respective follower arms 771 and 781 to return the various mechanisms to their normal position.

By the means described, the value accumulated in the accumulator cams has automatically been subtracted therefrom to return the cams to their zero positions and completely clear the register. In addition, the follower arm 791 strikes the ear 877 on the latching member 871, thereby disengaging it from the pin 870, permitting the slide 855 to return to its normal position. The machine is then clear and ready for further operation.

We claim:

1. The combination in one order of a calculating machine register comprising a slide, a rack mounted upon said slide for longitudinal movement relative thereto equivalent to one unit space, a latching means normally holding said rack in one extreme position on said slide, spring means adapted to move the rack to the other extreme position on said slide, an accumulating gear, means for connecting said gear with said rack prior to travel of said slide in one direction and for causing disengagement of same upon travel in the other direction, a carry tooth associated with said gear, a releasing means positioned by said carry tooth upon passing of said gear between 0 and 9 positions to disengage the rack latch in the next higher order, a differentially positionable indicating member, a sensing means operative to position said indicating member corresponsive with the angular rotation of said gear, a lever having one end connected to said slide, power means for rocking the other end of said lever, a positionable fulcrum member for said lever, spring means to differentially position said fulcrum member, means for restoring the fulcrum member to an inoperative position, a clearing control member, means controlled by said clearing control member for disabling said releasing means to prevent a carry from the 0 to the 9 position, and for sequentially enabling said gear connecting means for rotation of said gear during the normal operative movement of said rack and for initiating said power means, then to induce said spring means to differentially move said fulcrum member until arrested by the disabled carry mechanism, and finally to cause disengagement of said gear from said rack.

2. In a calculating machine, the combination of a longitudinally displaceable rack, an accumulating gear deriving differential rotation from said rack, means for checking rotation of said gear at a predetermined angularly rotated position thereof, a lever having one extremity connected to said rack to move the same, means for rocking the other extremity of said lever through an invariably constant path, a positionable fulcrum means for said lever, and means for actuating said fulcrum means to differentially displace said rack to a position determined by said checking means.

3. In a calculating machine, the combination of a longitudinally displaceable rack, a gear adapted to derive rotation from said rack, means for stopping rotation of said gear at a predetermined angularly rotated position thereof, means for operatively connecting said gear to said rack during movement of said rack in one direction and for disconnecting the two during movement in the other direction, means for differentially displacing said rack comprising a lever one end of which is connected to said rack to move the same and the other end of which is operatively connected to a crank rockable through an invariable path of constant length, power means including a cam, for rocking said crank, said cam providing rocking of said crank in one direction, a relatively long dwell and then rocking of said crank in a reverse direction, a positionable fulcrum means for said lever, and means for actuating said fulcrum means during the dwell on said cam means to differentially displace said rack to a position determined by said stop means.

4. An accumulator for a calculating machine comprising a shaft, a plurality of indicating means rotatably mounted on said shaft, a second shaft substantially parallel to said first shaft, an accumulating gear for each indicating means mounted on said second shaft, means for differentially rotating said gears additively or subtractively, selective means for determining the sign character rotation of said gears by said rotating means, a single sensing means controlled by the position of the accumulating gears operative to position the indicating means, a detent means for cooperation with said sensing means to positively retain said gears in their differentially rotated position during and following the operative positioning of said sensing means, and means operative during operation of said accumulating gear to disable said sensing means and said detent means.

5. A register for a calculating machine comprising in each order a rack, means for longitudinally shifting said rack proportional to the value to be entered, a gear constantly engaged by said rack, a pair of constantly engaged gears selectively positionable for either or neither to engage said first gear, a cam carried by one of said pair of gears, a rocker arm having a nose adapted to engage said cam at one end and a gear segment at the other, a rotatable indicator means having a gear segment engaging said first mentioned gear segment, and register control means operable to disengage said rocker from said cam prior to movement of said rack and to re-engage said rocker with said cam subsequent to movement of said rack.

6. A register for a calculating machine comprising a plurality of rotatable indicators, a gear associated with each indicator, a cam carried by said gear, sensing members positioned by said cams and operable to position the rotatable indicators, a rack associated with each gear, means for longitudinally shifting said racks proportional to the values to be entered, and register control means operable to disengage said sensing members from said cams and to engage said gears with said racks prior to movement of said racks, and to re-engage said members with said cams and disengage said gears from said racks subsequent to movement of said racks.

7. A registering means for a calculating machine comprising longitudinally displaceable slides, means for imparting differential longitudinal displacement to said slides, a rack mounted for longitudinal displacement on each slide, spring means urging each rack to one extreme position with respect to said slide, latching means for normally holding each rack in the other extreme position with respect to said slide, an accumulator gear associated with each such rack, means operable to connect said gears with said racks during movement of said slides in one direction and for disconnecting them prior to movement in the other direction, latch releasing means operable upon rotation of the accumulating gear of the next lower order through the 0-9 position, a plurality of positionable indicating members, sensing means operative to position said indicating members in accordance with the position of said accumulator gears, and means for disabling said sensing means during movement of said slides in said one direction and for enabling said sensing means prior to movement of said slides in the other direction.

8. An ordinal registering means for a calculating machine, comprising the combination of a longitudinally displaceable slide, a rack mounted for longitudinal displacement on said slide, means urging said rack to one extreme position relative to said slide, a latch normally holding said rack in the other extreme position for movement with said slide, a gear adapted to derive rotation from said rack, means operative to connect said gear to said rack for rotation by said rack in one direction and to initiate means for disconnecting the two during movement in the other direction, means for releasing said latch upon rotation of the gear of the next lower order through the 9-0 position, a lever connected at one end to said slide, means for rocking the other end of said lever through an invariable constant path, a movable fulcrum means for said lever, means to differentially position said fulcrum means, a positionable indicating member, sensing means normally operative to position said indicating member in accordance with the angular rotation of said gear, and means operable by said connecting means and during movement of said rack in said one direction to disengage said sensing means.

9. A calculating machine comprising a settable value selecting means, a register, a longitudinally displaceable selection plate for each order of said register adapted to cooperate differentially with said value selecting means for each ordinal value to be entered, spring means urging said plates to an extreme value entering position, latching means normally holding each of said plates in the other extreme position, means operative with the entry of each ordinal value in the value selecting means to condition said last-mentioned latching means for release, a fulcrum member carried by each of said plates, a lever engaging said fulcrum member, a rockable bail common to one end of said levers, motor means for operating said bail through a constant path, an actuating slide connected to the free end of each lever, an arcuately adjustable gear train for actuating said register from movement of said slides, and a control member for releasing the conditioned latching means, adjusting said gear train, and initiating operation of said motor means.

References Cited in the file of this patent

UNITED STATES PATENTS

| Number | Name | Date |
|---|---|---|
| 1,028,135 | Rein | June 4, 1912 |
| 1,113,099 | Bundy | Oct. 6, 1914 |
| 1,185,696 | Martin | June 6, 1916 |
| 1,189,288 | Rechnitizer | July 4, 1916 |
| 1,203,863 | Ellis | Nov. 7, 1916 |
| 1,568,300 | Coss | Jan. 5, 1926 |
| 2,063,740 | Henderson | Dec. 8, 1936 |
| 2,153,299 | Dahlberg | Apr. 4, 1939 |
| 2,429,522 | Mehan | Oct. 21, 1947 |
| 2,557,585 | Wockenfuss | June 19, 1951 |